United States Patent
Itokawa

(10) Patent No.: US 7,561,736 B2
(45) Date of Patent: Jul. 14, 2009

(54) IMAGE PROCESSING APPARATUS AND METHOD OF THE SAME

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 11/281,012

(22) Filed: Nov. 17, 2005

(65) Prior Publication Data
US 2006/0115167 A1   Jun. 1, 2006

(30) Foreign Application Priority Data

Nov. 26, 2004  (JP) .............. 2004-342104
Nov. 26, 2004  (JP) .............. 2004-342105
Nov. 15, 2005  (JP) .............. 2005-330765

(51) Int. Cl.
*G06K 9/34* (2006.01)
(52) U.S. Cl. .............. 382/173; 382/175; 382/236; 382/260
(58) Field of Classification Search .............. 382/173, 382/175, 236, 239, 260; 356/237.1; 131/905; 375/E7.135, E7.162; 345/89
See application file for complete search history.

(56) References Cited

U.S. PATENT DOCUMENTS 5,786,859 A    7/1998  Ueno et al. ............ 375/240.15
5,990,962 A   11/1999  Ueno et al. ............ 375/240.16
6,169,600 B1 *  1/2001  Ludlow ................... 356/237.1

FOREIGN PATENT DOCUMENTS

JP    8-018977 A    1/1996
JP    9-298753 A   11/1997

* cited by examiner

Primary Examiner—Anh Hong Do
(74) Attorney, Agent, or Firm—Canon U.S.A. Inc., I.P. Division

(57) ABSTRACT

An image processing apparatus can perform highly efficient coding that generates less visible distortion. The image processing apparatus includes a pre-processing unit configured to reduce the data amount of an input image and output the image after reducing its data amount and a coding unit configured to receive an output from the pre-processing unit and output coded data. The pre-processing unit includes a region segmentation unit configured to divide a frame image into regions, a filter setting unit configured to set filter strength, an intermediate region setting unit configured to generate an intermediate filter region in accordance with the filter strength, and a filter processing unit configured to perform filter processing at the set filter strength. Filter regions and filter strength can be set in accordance with the code length.

19 Claims, 37 Drawing Sheets

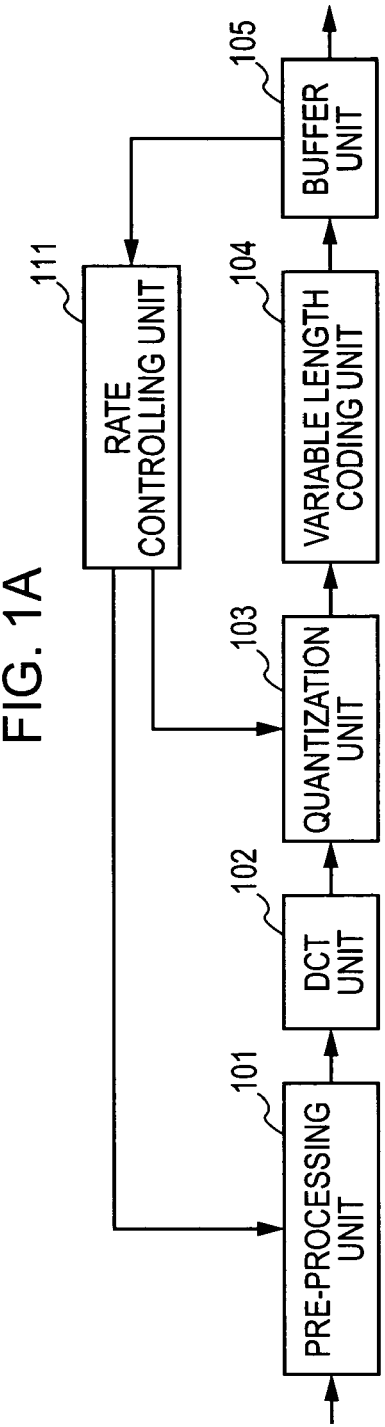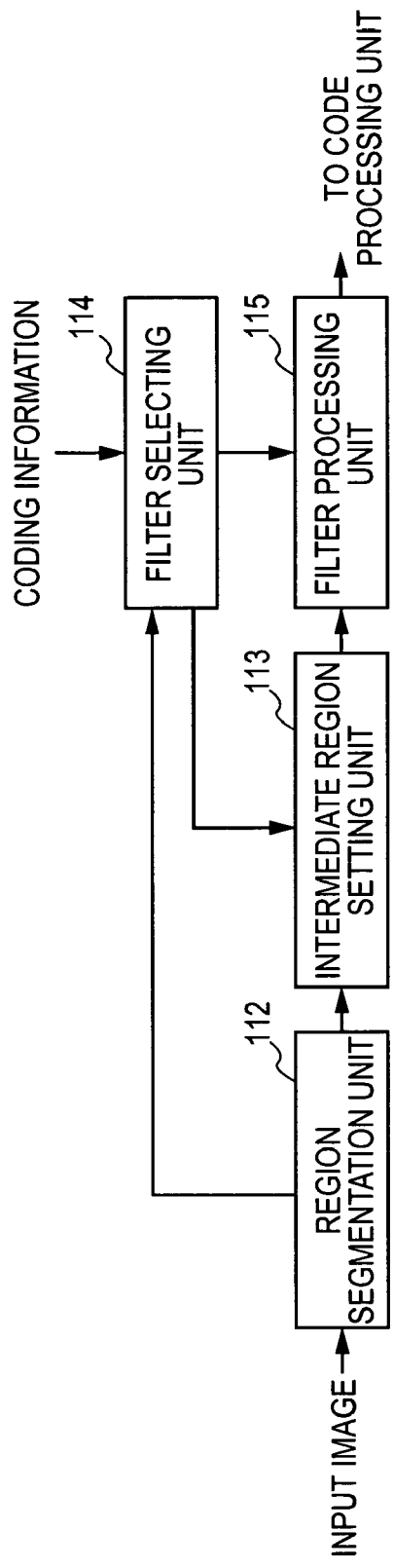

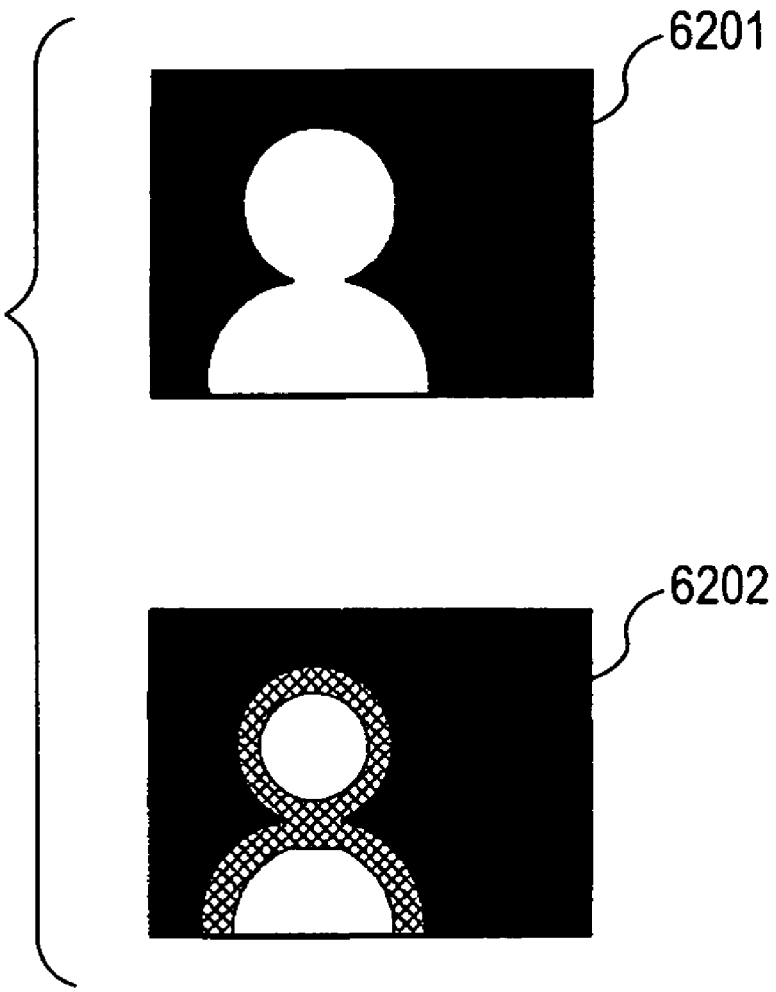

IMAGE PROCESSING APPARATUS AND METHOD OF THE SAME

BACKGROUND OF THE INVENTION

1. Field of the Invention

The present invention relates to an image processing apparatus and a method of processing an image and, more specifically, relates to technology for coding still image data and moving image data in a highly efficient manner.

2. Description of the Related Art

Recently, methods for coding moving images, such as the Moving Picture Experts Group phase 2 (MPEG-2) (conforming to International Organization for Standardization (ISO)/ International Electro-technical Commission (IEC) 13818), are at wide use in the fields of storage, communication, and broadcasting. According to such a method, each frame image is divided into a plurality of coded blocks. Then, a frame image or a plurality of frame images is orthogonally transformed and the transformation coefficient is quantized to reduce the amount of data corresponding to an image. Variable length coding is carried out on the reduced image data. When carrying out this process, the amount of data can be significantly reduced by using a large quantization coefficient. However, the use of a large quantization coefficient causes quantization error to be great, significantly reducing the image quality due to distortion, such as block distortion and/or mosquito noise. For still images, the Joint Photographic Experts Group (JPEG) coding method is most widely used. Similarly, when compressing a still image into a considerably small file size, quantization error is increased, causing block distortion and/or mosquito noise.

A pre-filter is known for decreasing quantization error. A pre-filter carries out processing, such as low-pass filter processing, on an input image to reduce the amount of data of the image before the image is sent to a coding device. Throughout an image, regions including a large amount of data and regions including a relatively small amount of data are unevenly distributed. Therefore, filter processing of the image can be efficiently and accurately carried out by changing the property of the filters used for the processing in accordance with the region of the image to be processed. Japanese Patent Laid-Open No. 9-298753 describes a method of coding moving images and a moving image coding apparatus capable of changing the property of a low-pass filter in accordance with the local differences in prediction errors to improve the subjective image quality.

Japanese Patent Laid-Open No. 8-18977 describes a method of improving the subjective image quality by changing the property of a low-pass filter in accordance with local differences in prediction errors.

However, according to the method described in Japanese Patent Laid-Open No. 9-298753, the filter property in changed for each region only on the basis of an analysis of the input image. According to this known method, the optimal image quality is not always achieved for the target code length because, if the target code length is set high, a pre-filter is not required or a weak pre-filter may be used, and, if the target code length is set low, a strong pre-filter is required. For this reason, satisfactory filter control is not possible when the control is only based on the characteristics of the input image.

Moreover, Japanese Patent Laid-Open No. 9-298753 describes a process for preventing degradation in the subjective image quality due to an extreme difference in the properties of filters used for processing adjacent blocks in an image. In this case, also, the difference in the properties of filter used for processing adjacent blocks depends on the target code length. Therefore, even if a fixed value is used, it is difficult to achieve optimal image quality.

The moving image coding and decoding apparatus described in Japanese Patent Laid-Open No. 8-18977 processes regions of an image where movement compensation is unpredictable using a strong filter. For this reason, when a scene change occurs, the image provided immediately after the scene change is processed with a strong filter, whereas the following images are processed with a weak filter.

However, according to the moving image coding and decoding apparatus described in Japanese Patent Laid-Open No. 8-18977, when the moving image includes a frame image capturing light from a flash, this frame image is processed with a strong filter, and the following frame images not including the light from a flash are also processed with a strong filter.

As a result, the frame image immediately before the flash and the frame immediately after the flash will have significantly different image qualities since the two frame images are processed with different filters even though they are strongly correlated with each other. This difference in image quality causes a significant reduction in the efficiency of coding performed on the subsequent frame images.

SUMMARY OF THE INVENTION

Embodiments of the present invention enable coding that generates less visible distortion in a highly efficient manner by solving the above-identified problems.

An image processing apparatus according to an embodiment includes a pre-processing unit configured to output an image after reducing the amount of data of the image and a coded data generating unit configured to generate coded data from the image whose amount of data has been reduced by the pre-processing unit. The pre-processing unit-includes a region segmentation unit configured to divide an image into a plurality of regions, a filter setting unit configured to set a filter strength for each region of an image divided by the region segmentation unit, an intermediate region setting unit configured to generate an intermediate region according to the filter strength set by the filter setting unit, and a filter processing unit configured to carry out filter processing according to the filter strength set by the filter setting unit.

A method of processing an image according to another embodiment includes a reducing step of reducing the amount of data of an image and outputting the image whose amount of data has been reduced and a producing step of producing coded data from the image whose amount of data has been reduced in the reducing step. The reducing step includes a dividing step of dividing a frame image into a plurality of regions, a setting step of setting a filter strength for each region of a frame image divided in the dividing step, a generating step of generating an intermediate region according to the filter strength set in the setting step, and a performing step of performing filter processing according to the filter strengths in the setting step.

An image processing apparatus according to another embodiment includes a pre-processing unit configured to output a moving image including a plurality of frames after reducing the amount of data of the image and a coded data generating unit configured to generate coded data from the moving image whose amount of data has been reduced by the pre-processing unit. The pre-processing unit includes a flash detecting unit configured to detect a frame in which light from a flash has been captured among a series of frames, a filter setting unit configured to set a filter strength in accordance with the detection result of the flash detecting unit, and a filter processing unit configured to carry out filter processing according to the filter strength set by the filter setting unit.

A method of processing an image according to another embodiment includes a reducing step of reducing the amount of data of a moving image including a plurality of frames and outputting the image whose amount of data has been reduced and generating coded data from the moving image whose amount of data has reduced in the reducing step. The reducing step includes a detecting step of detecting a frame in which light from a flash has been captured among a series of frames, a setting step of setting a filter strength in accordance with the detection result from the detecting step, and a performing step of performing filter processing according to the filter strength set in the setting step.

Since filter regions and filter strengths are set in accordance with the code length of the image, highly efficient coding that generates less visible distortion can be carried out.

According to another embodiment, a frame image that has captured light from a flash is detected on the basis of a relatively weakened correlation between the frame images previous and subsequent to the current frame image. Filter strengths are set on the basis of the information concerning such correlations. Therefore, highly efficient coding that generates less visible distortion can be carried out.

Further features of the present invention will become apparent from the following description of exemplary embodiments (with reference to the attached drawings).

BRIEF DESCRIPTION OF THE DRAWINGS

FIGS. 1A and 1B are block diagrams of an image processing apparatus according to a first embodiment.

FIG. 38 illustrates image data, divided regions, and generated intermediate regions according to the eighth embodiment.

DESCRIPTION OF THE EMBODIMENTS

Figure 2:
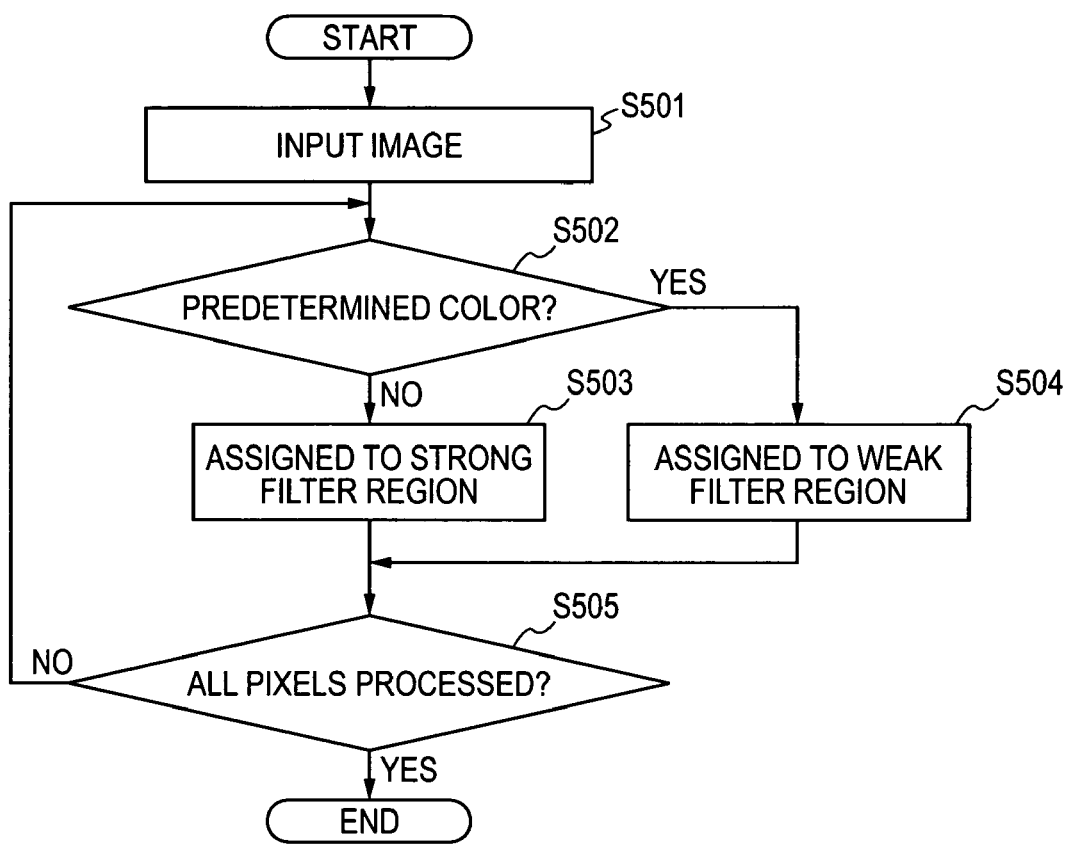
FIG. 2 is a flow chart of a process according to the first embodiment for detecting regions by detecting a predetermined color in pixel units.

Exemplary embodiments of the present invention will be described below with reference to the drawings.

First Embodiment

First, a first embodiment will be described.

FIG. 1A is a block diagram illustrating the overall structure of an image processing apparatus capable of performing coding. An input image is processed with a pre-filter at a pre-processing unit 101 and is sent through a discrete cosine transform (DCT) unit 102, a quantization unit 103, and a variable length coding unit 104 in order. Variable length coding is carried out on each macro-block included in the input image.

Discrete cosine transformation (DCT) is carried out on the image blocks at the DCT unit 102, and, then, quantization of the DCT coefficients is carried out at the quantization unit 103. The coefficients quantized at the quantization unit 103 are transformed into two-dimensional Huffman codes at the variable length coding unit 104.

The coded data is stored in a buffer unit 105. A rate controlling unit 111 monitors the generated code length and sends feedback to the pre-processing unit 101 and the quantization unit 103.

According to this embodiment, the output from the pre-processing unit 101 is controlled on the basis of information sent from the rate controlling unit 111. Details of the pre-processing unit 101 are described below with reference to FIG. 1B.

First, an input image is divided into multiple regions by a region segmentation unit 112. At a filter selecting unit 114, filter characteristics of a filter used to process each divided region are set on the basis of the information sent from the rate controlling unit 111. At this time, if it is determined that an intermediate region is required on the basis of the filter characteristics, filter characteristics of a filter used to process an intermediate region is set, and the intermediate region setting unit 113 generates a new intermediate region. A filter processing unit 115 provides filters in accordance with the filter characteristics set for each region and outputs a filtered image.

Now, the process carried out by the region segmentation unit 112 on a still image will be described.

FIG. 2 is a flow chart of a process of dividing an image into a plurality of regions by identifying a predetermined color. The process is carried out for each pixel included in the image.

In Step S501, an image is input. Then, in Step S502, it is determined whether a pixel of the input image is a predetermined color. The easiest method for determining whether a pixel is a predetermined color is to determine whether the value of the pixel is within a predetermined range. In Step S502, if the pixel is determined to be a predetermined color, the process proceeds to Step S504 to assign the pixel to a region to be processed with a weak filter, i.e., a weak filter region. In this way, the resolution of regions including pixels of the predetermined color will be prevented from being reduced.

In Step S502, if the pixel is determined to not be a predetermined color, the process proceeds to Step S503 to assign the pixel to a region to be processed with a strong filter, i.e., a strong filter region. By using a strong filter to process regions not including pixels of the predetermined color, the entire amount of data of the image is reduced while the proportion of the code length of the region including pixels of the predetermined color to the code length of the entire image is relatively increased.

After Step S504 or S503 is completed, the process proceeds to Step S505 to determine whether all pixels included in the image are processed. If it is determined in Step S505 that all pixels in the frame have not been processed, the process is returned to Step S502 and the subsequent steps are repeated until all pixels in the frame image are processed. The entire process is completed when all pixels are processed.

Figure 3:
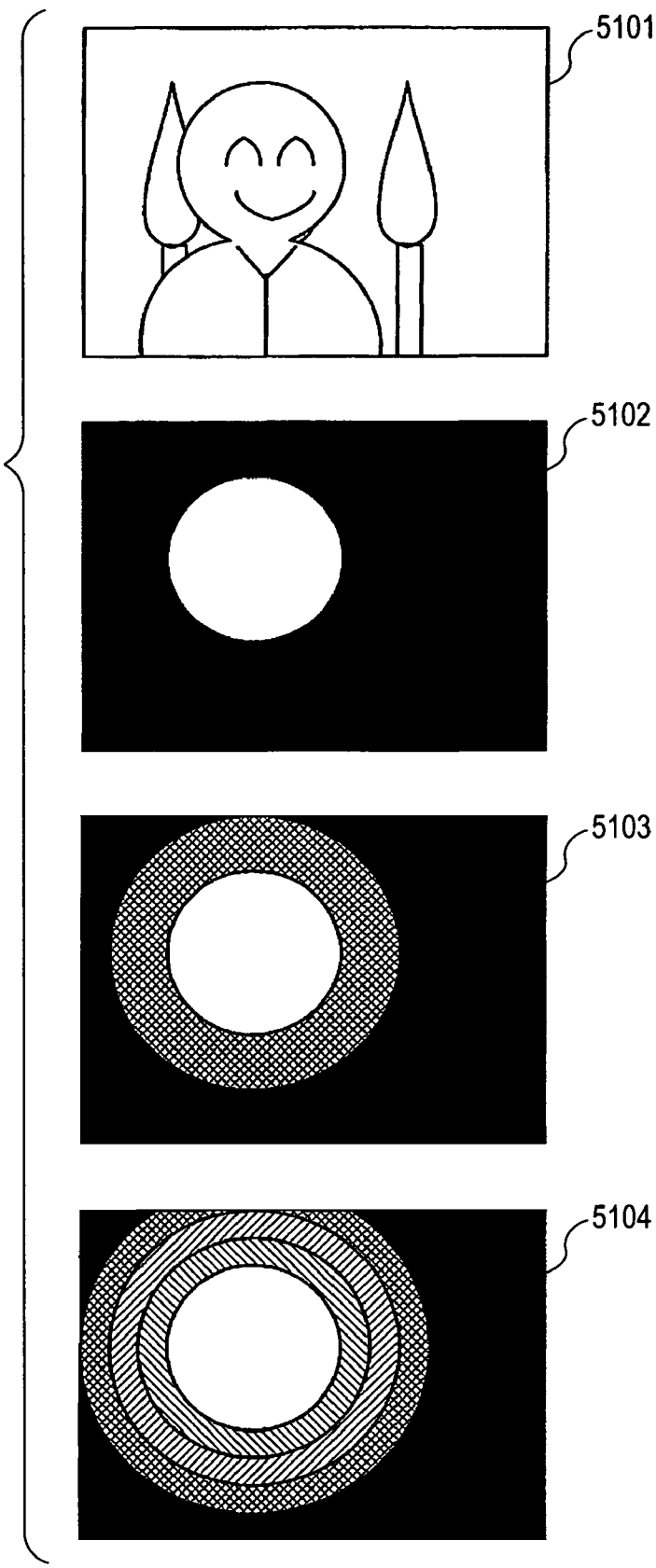
FIG. 3 illustrates image data, divided regions, and generated intermediate regions according to the first embodiment.

FIG. 3 illustrates images displayed on a screen. An image 5102 is obtained by detecting regions of flesh color, which is assigned as a predetermined color, in an input image 5101. The white circle the image 5102, as shown in FIG. 3, corresponds to the flesh color region detected in the input image 5101, whereas the black region corresponds to regions of other colors in the input image 5101. By using a weak filter to process the flesh color region, the resolution of the object's face is prevented from being reduced.

Figure 4:
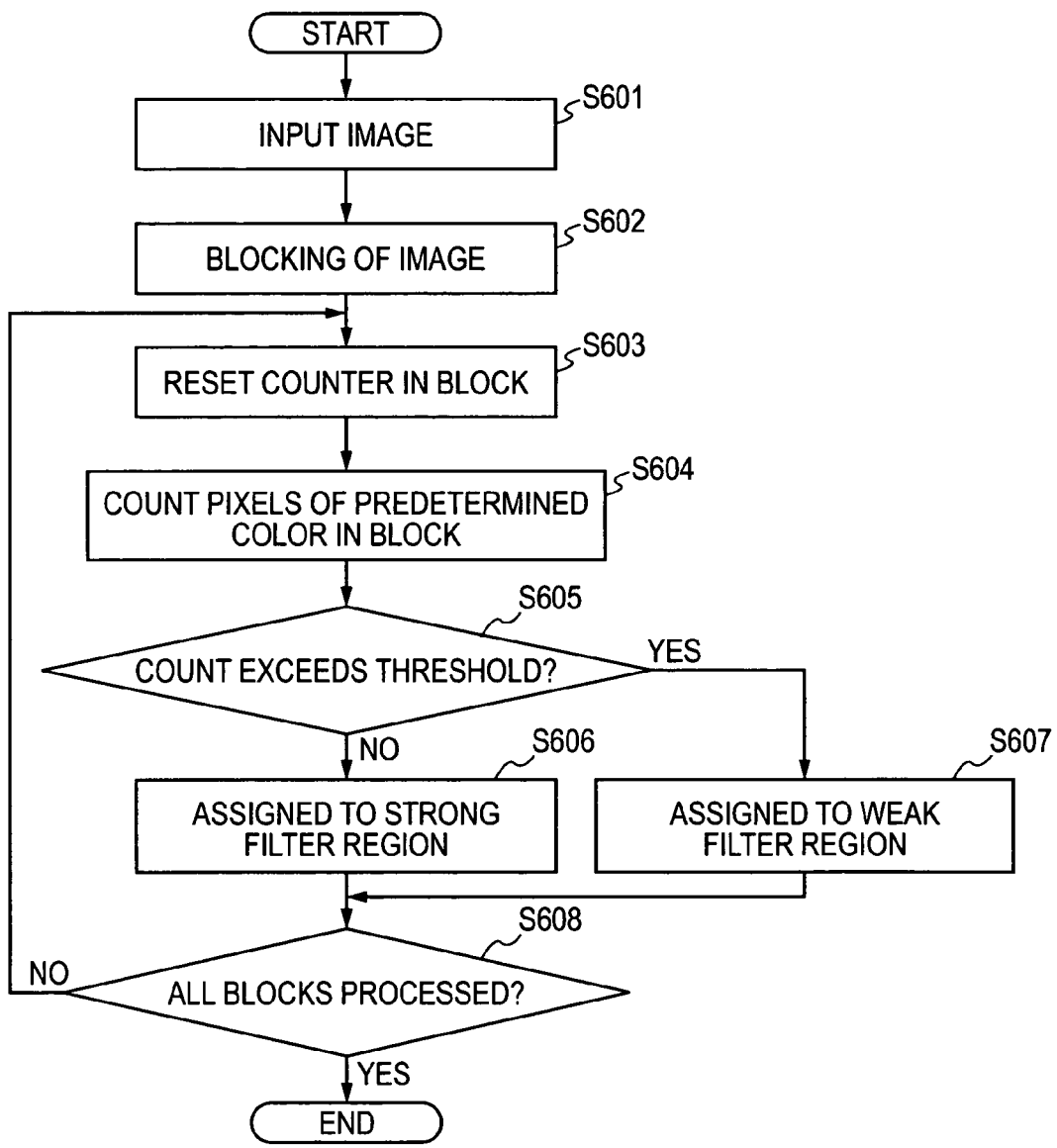
FIG. 4 is a flow chart of a process according to the first embodiment for detecting a region by detecting a predetermined color in block units.

FIG. 4 is a flow chart of a process of dividing an image into blocks by identifying a predetermined color.

First, in Step S601, an image is input. Next, in Step S602, the image is divided into a plurality of blocks. The process corresponding to the subsequent step is carried out on each block. In Step S603, a counter in a block is reset to its initial value, "0."

Then, in Step S604, the number of pixels of a predetermined color in the block is counted. After determining whether a pixel is a predetermined color for all pixels in the block, the process proceeds to Step S605 to determine whether the number of counted pixels exceeds a predetermined threshold value.

In Step S605, if it is determined that the number of counted pixels exceeds the threshold value, the process proceeds to Step S607 to assign the block as a weak filter region. In Step S605, if it is determined that the number of counted pixels does not exceed the threshold value, the process proceeds to Step S606 to assign the block as a strong filter region, not including many pixels of the predetermined color.

In Step S608, it is determined whether all blocks have been processed. If it is determined that all blocks have not been processed, the process is returned to Step S603 and the subsequent steps are repeated. In Step S608, if it is determined that all blocks have been processed, the process of dividing the input image into blocks by identifying the predetermined color is completed.

Figure 5:
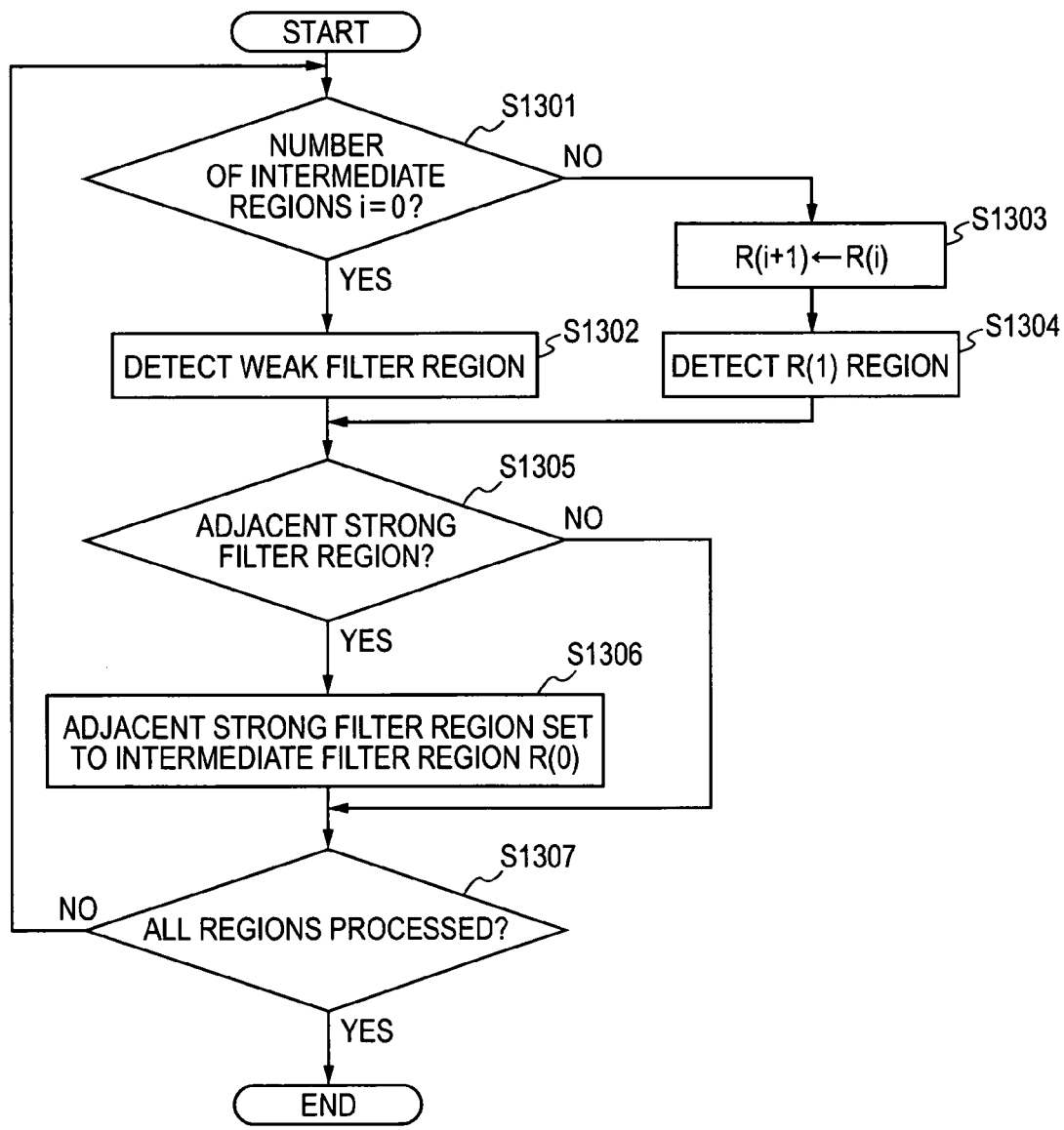
FIG. 5 is a flow chart of a process according to the first embodiment for generating intermediate regions in pixel units.

The process carried out by the intermediate region setting unit 113 is described below with reference to FIG. 5. This process is carried out when the filter selecting unit 114 determines that intermediate regions should be generated. First, in Step S1301, the current number of intermediate regions is counted. If the number of intermediate regions i is zero (i=0), weak filter regions are detected in Step S1302.

In Step S1305, the intermediate region setting unit 113 determines whether strong filter regions are provided in the vicinity of the weak filter regions. If a strong filter region is provided adjacent to a weak filter region, the strong filter region is defined, in Step S1306, as an intermediate filter region R(0), i.e., a region to be processed with an intermediate filter. By carrying out this process for the entire image, intermediate filter regions are generated in the strong filter regions adjacent to weak filter regions.

Next, a process for generating new intermediate filter regions in addition to the existing intermediate filter regions will be described. First, in Step S1301, the current number of intermediate regions is counted. If the number of intermediate regions i is greater than zero (e.g., in this case i=1), the number of intermediate regions is changed in Step S1303. Accordingly, the intermediate filter region R(0) is changed to R(1). Next, in Step S1304, the intermediate filter region R(1) is detected. The detected intermediate filter region R(1) is set so that it is processed by the strongest filter among the filters used to process all current intermediate filter regions.

In Step S1305, it is determined whether a strong filter region is provided in the vicinity of the intermediate filter region R(1). If the intermediate filter region R(1) is adjacent to a strong filter region, this strong filter region is defined as an intermediate filter region R(0) in Step S1306. By carrying out this process throughout the entire image, new intermediate filter regions are generated in the strong filter regions adjacent to existing intermediate filter regions.

An image 5103 illustrated in FIG. 3 includes one intermediate region generated as a result of detecting a predetermined color in the image 5102. An image 5104 is an exemplary image including three intermediate regions. By changing the strengths of the filters used to process the three intermediate regions, a drastic change in resolution at the border of the weak filter region and the strong filter region can be prevented.

Figure 6:
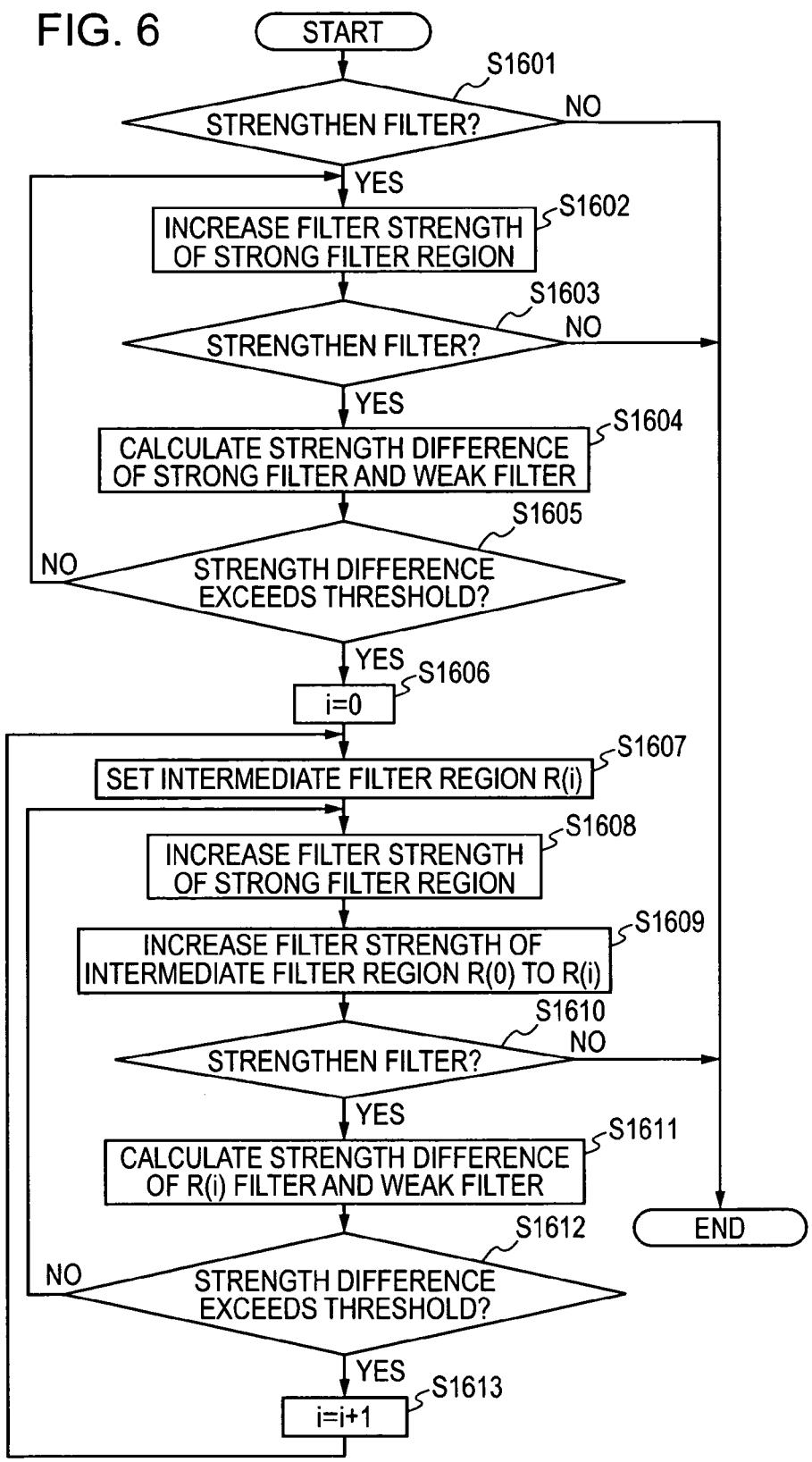
FIG. 6 is a flow chart of a process according to the first embodiment for selecting a filter.

Next, the process carried out by the filter selecting unit 114 will be described below with reference to the flow chart in FIG. 6.

In Step S1601, it is determined whether the filter strength should be increased. That is, if a generated code amount is over a target code amount, it is determined that the filter strength needs to be increased. If the generated code amount is not over the target code amount, it is determined that the filter strength does not need to be increased.

If it is determined that the filter strength does not need to be increased, the process is ended. On the other hand, if it is determined that the filter strength needs to be increased, the process proceeds to Step S1602 to increase the filter strength set for a strong filter region. In Step S1603, it is determined whether the filter strength set for a strong filter region has been sufficiently increased. In Step S1603, if it is determined that the filter strength does not need to be further increased, the process is ended.

If it is determined that the filter strength should be further increased, the process proceeds to Step S1604 to calculate the difference of the filter strengths set for the strong and weak filter regions. Then, in Step S1605, it is determined whether the difference exceeds a threshold value.

In Step S1605, if it is determined that the difference does not exceed the threshold value, the process is returned to Step S1602 and the subsequent steps are repeated to increase the filter strength set for the strong filter region. When it is determined in Step 1605 that the difference between the filter strengths set of the strong and weak filter regions exceeds the threshold value due to the increase in the filter strength set for the strong filter region, an intermediate filter region is generated and the filter strength of the filter to be used to process the generated intermediate filter region is set, as described below.

In Step S1606, the number of intermediate regions i is reset to the initial value zero (i=0). Then, the process proceeds to Step S1607 to generate an intermediate filter region R(i) (which, at this point of time, is R(0)). An intermediate filter region is generated as described above. Then, the process proceeds to Step S1608 to increase the filter strength set for the strong filter region. Subsequently, in Step S1609, the filter strength of the intermediate filter region is increased.

Next, in Step S1610, it is determined whether the filter strength should be further increased. If it is determined that the filter strength does not need to be further increased, the process is ended. If it is determined that the filter strength needs to be further increased, the process proceeds to Step S1611 to calculate the difference of the filter strengths set for the intermediate filter region R(i) (which, at this point of time, is R(0)) and the weak filter region.

In Step S1612, it is determined whether the difference of the filter strengths exceeds a threshold value. If it is determined that the difference does not exceed the threshold value, the process is returned to Step S1608 to increase the filter strengths set for the strong and intermediate filter regions. If the difference exceeds the threshold value, the number of intermediate regions i is increased by one in Step S1613. Then, in Step S1607, a new intermediate filter region R(i) (which, at this point of time, is R(1)) is generated.

In this way, the filter strengths set for the strong intermediate filter regions are increased and additional intermediate regions are newly generated until it is determined in Step S1610 that the filter strength does not need to be further increased. As a result, the resolution of the weak filter regions is maintained while the resolution of the regions around the weak filter regions is gradually reduced.

Figure 7:
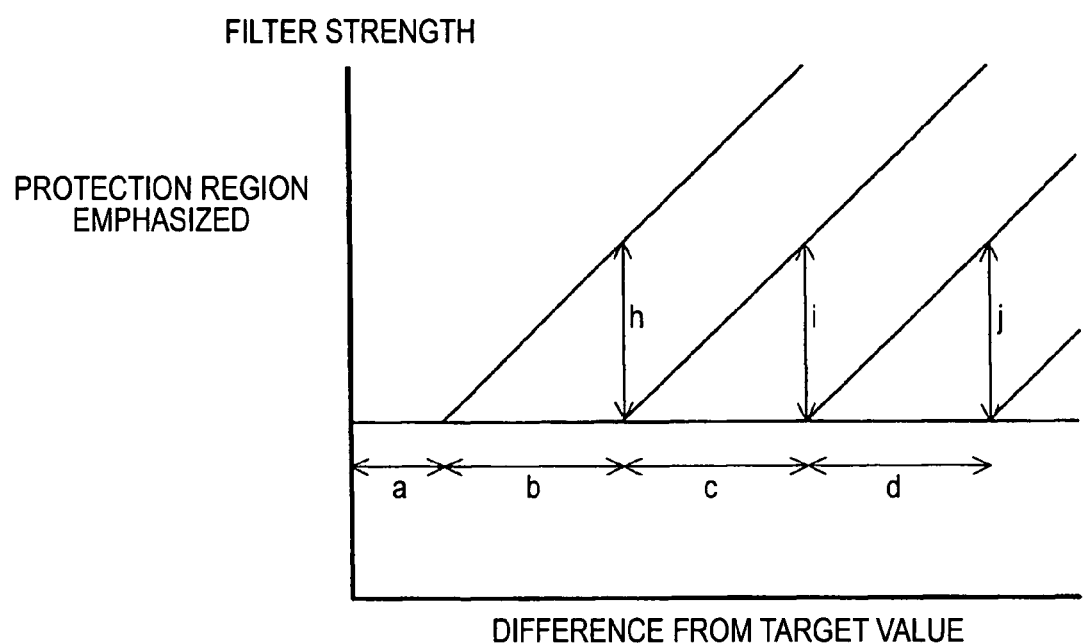
FIG. 7 is a characteristics chart showing a method for gradually increasing the filter strength according to the first embodiment.

FIG. 7 is a characteristics chart showing a graph illustrating a method for gradually increasing filter strength. In FIG. 7, the horizontal axis represents the difference between a target data amount to be obtained by using a filter and the actual data amount. A stronger filter is required as the difference becomes greater toward the right. The vertical axis represents the filter strength of a filter. Filter strength is increased along the upward direction of the axis. As shown in FIG. 7, in a first zone a, a filter for reducing the image data is not required. If desired, a weak filter may be used to process the entire image to remove noise.

In a second zone b, the filter strength set for the strong filter region is increased. In the second zone b, an intermediate filter region does not need to be generated because the difference between the filter strengths set for the strong and weak filter regions is small. When the difference between the filter strengths set for the strong and weak filter regions exceeds a threshold value, a new intermediate region is generated. The difference between the filter strengths set for the strong and weak filter regions is represented by h in the graph.

In a third zone c, the filter strengths set for the strong filter region and the intermediate filter region are both increased. When the difference between the filter strengths set for the strong and intermediate filter regions exceeds a threshold value, a new intermediate region is generated. The difference between the filter strengths set for the strong filter region and the existing intermediate filter region is represented by i in the graph. Similarly, as shown in a fourth zone d, each time the difference between the filter strengths set for the strong and weak filter regions exceeds the threshold value, a new intermediate region is generated.

According to the first embodiment, by dividing an image into regions to be processed with filters based on the coding information and setting the filter strengths for the filters used to process these regions, distortion due to coding can be reduced. Moreover, by providing intermediate regions in regions where resolution is to be maintained, the difference in resolutions of regions where the resolution is maintained and other regions where resolution is reduced can be moderated. In this way, the image will visually appear more natural.

According to the first embodiment, when it is determined that an intermediate region should be generated on the basis of the filter strengths set for the regions, a new intermediate region is generated by the intermediate region setting unit 113. In this way, filters having filter characteristics suitable for each region are used to process each region. Accordingly, the differences in filter strengths set for adjacent regions are compensated for, and an image with optimal quality can be obtained.

Second Embodiment

Next, an image processing apparatus according to a second embodiment will be described. According to the first embodiment, an image is divided into regions by detecting pixels with a predetermined color. According to the second embodiment, neighboring regions in an image are integrated.

Figure 8:
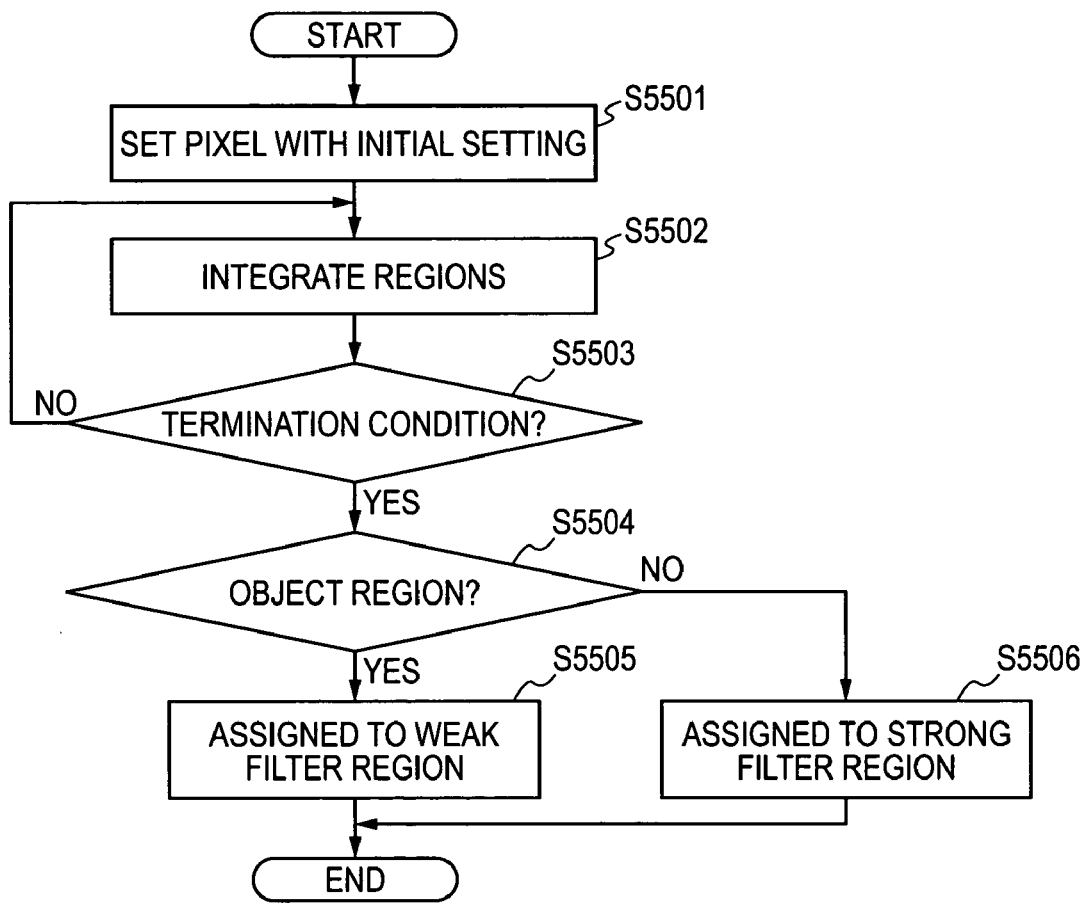
FIG. 8 is a flow chart of a process of detecting regions by integrating regions of similar colors according to a second embodiment.

The overall structure of the image processing apparatus according to the second embodiment is the same as that illustrated in FIG. 1A. Therefore, a block diagram illustrating the structure of the image processing apparatus according to the second embodiment is not provided. The difference in the image processing apparatuses according to the first and second embodiments is the process carried out by the region segmentation unit 112. The process carried out by the region segmentation unit 112 according to the second embodiment will be described below with reference to a flow chart shown in FIG. 8.

In Step S5501, initial values of the pixels are set. This is a process to set a central pixel, located at the center of the region to be expanded, at an initial value. Next, in Step S5502, the degree of similarity of the central pixel and its adjacent pixels is determined. If the pixels are similar, they are integrated. This process is repeated until a termination condition is fulfilled in Step S5503. By repeating this process, pixels with similar colors are integrated into the same region. The region is expanded until the border where pixels of different colors exist is reached. When the termination condition is fulfilled, several integrated regions are generated as a result of the integration process. These integrated regions are defined as object regions in Step S5504. In Step S5504, a region defined as an object region is defined as a weak filter region and a region not defined as an object region is defined as a strong filter region. The processing then ends.

Since the steps after providing regions by defining the object regions are the same as those according to the first embodiment, descriptions thereof are not repeated here.

Figure 9:
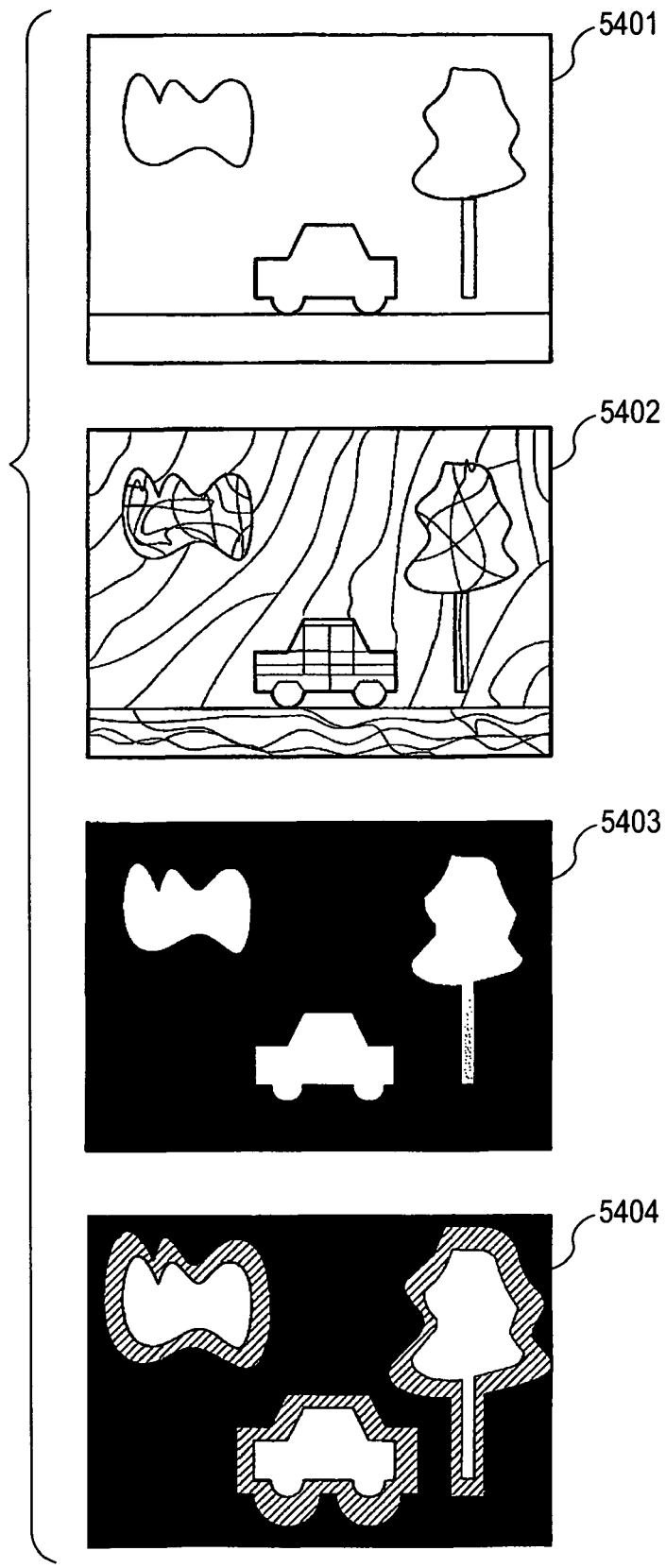
FIG. 9 illustrates image data, divided regions, and generated intermediate regions according to the second embodiment.

FIG. 9 illustrates the process of defining object regions. An input image 5401 is an image not yet divided into regions. An image 5402 is obtained by setting initial values for pixels and expanding the regions around these pixels. Pixels with similar colors are integrated into small regions. If any of these small regions adjacent to each other are similar colors, these small regions are integrated into larger regions. By repeating this process, the image is divided into regions with difference colors. An image 5403 is obtained by digitalizing the image 5402 having different regions. In the image 5403, the regions in white are object regions defined as weak filter regions and the regions in black are defined as strong filter regions. When intermediate regions are provided for the image 5403, an image 5404 is obtained in which the hatched regions represent the intermediate filter regions.

Third Embodiment

An image processing apparatus according to a third embodiment will be described below. The image processing apparatus according to this embodiment is capable of processing moving images.

Figure 10:
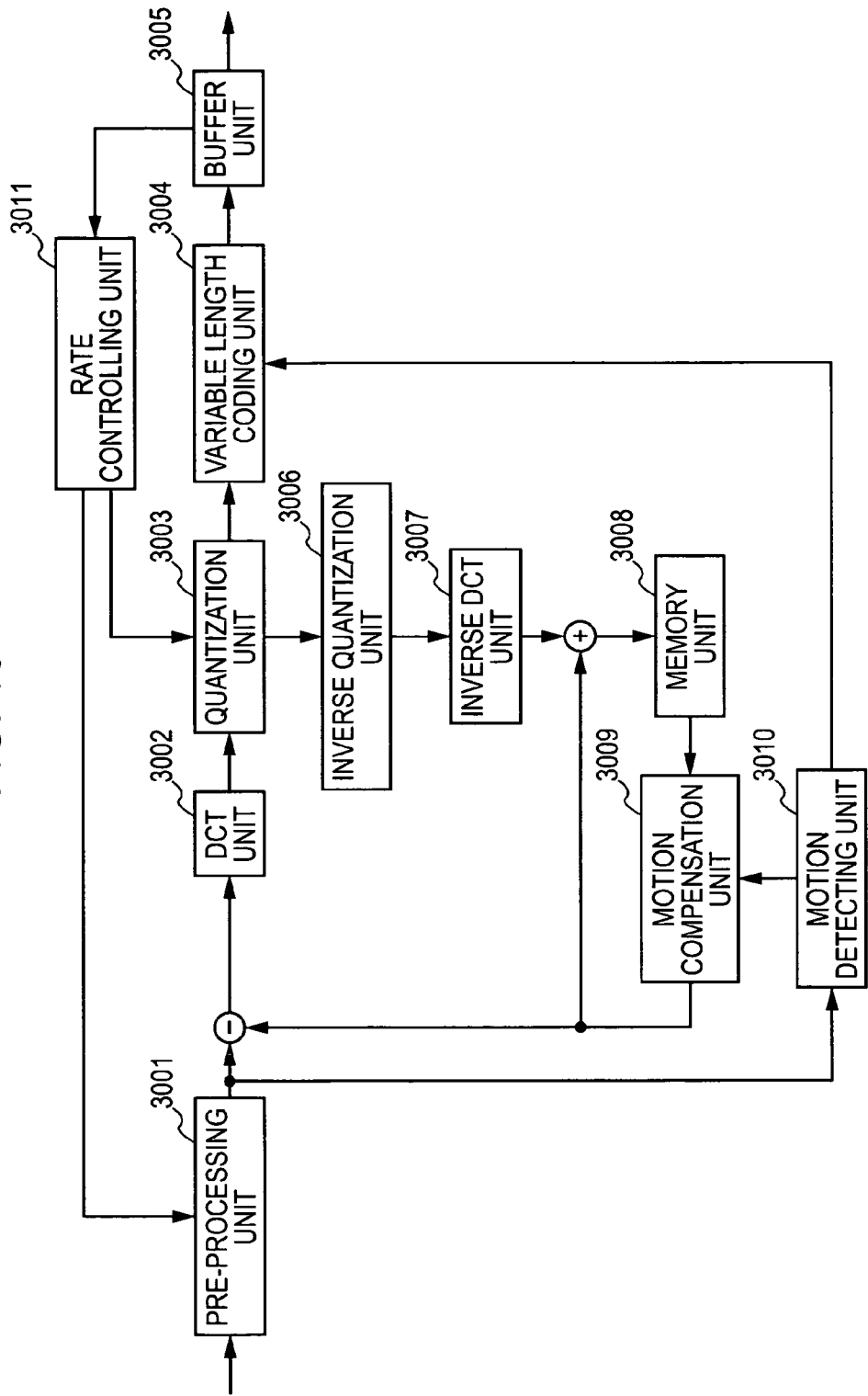
FIG. 10 is block diagram illustrating an image processing apparatus according to a third embodiment.

FIG. 10 is a block diagram showing the overall structure of the image processing apparatus. An input image is processed with a pre-filter at a pre-processing unit 3001 and is sent through a DCT unit 3002, a quantization unit 3003, and a variable length coding unit 3004 in order. Variable length coding is performed in macro-block units. The variable length coding includes an intra mode in which processing is carried out within a frame image and an inter mode in which processing is carried out in adjacent frame images.

In an intra mode, DCT is carried out on image blocks at the DCT unit 3002, and, then, quantization of the DCT coefficients is carried out at the quantization unit 3003. The coefficients quantized at the quantization unit 3003 are transformed into two-dimensional Huffman codes at the variable length coding unit 3004. In an inter mode, the quantized coefficients are returned to their original form at an inverse-quantization unit 3006. Then, at an inverse DCT unit 3007, the image data is returned to its original form. This image is generally referred to as a locally decoded image. The locally decoded image is stored in a memory unit 3008 as a reference image corresponding to a current frame image.

At a motion detecting unit 3010, movement in the current input image is detected by comparing the current input image with the reference image. Then, alignment of the images is carried out at a motion compensation unit 3009. In this way, a moving image input to the DCT unit 3002 in an inter mode is converted into a difference signal after adjacent frame images are aligned. At the quantization unit 3003, a DCT coefficient for the difference is quantized. Then, at the variable length coding unit 3004, the quantized coefficient of the difference is converted into a Huffman code. Since the image decoded by the inverse-quantization unit 3006 and the inverse DCT unit 3007 is difference data, a locally decoded image is generated by combining the output from the motion compensation unit 3009 with this difference data. Quantization is controlled in accordance with the buffer amount of a buffer unit 3005 monitored by a rate controlling unit 3011.

In this embodiment, an output from the pre-processing unit 3001 is controlled in accordance with the information sent from the rate controlling unit 3011. Details of the pre-processing unit 3001 are the same as the details of the pre-processing unit 101 according to the first embodiment illustrated in FIG. 1B.

The process carried out by a region segmentation unit is described next.

Figure 11:
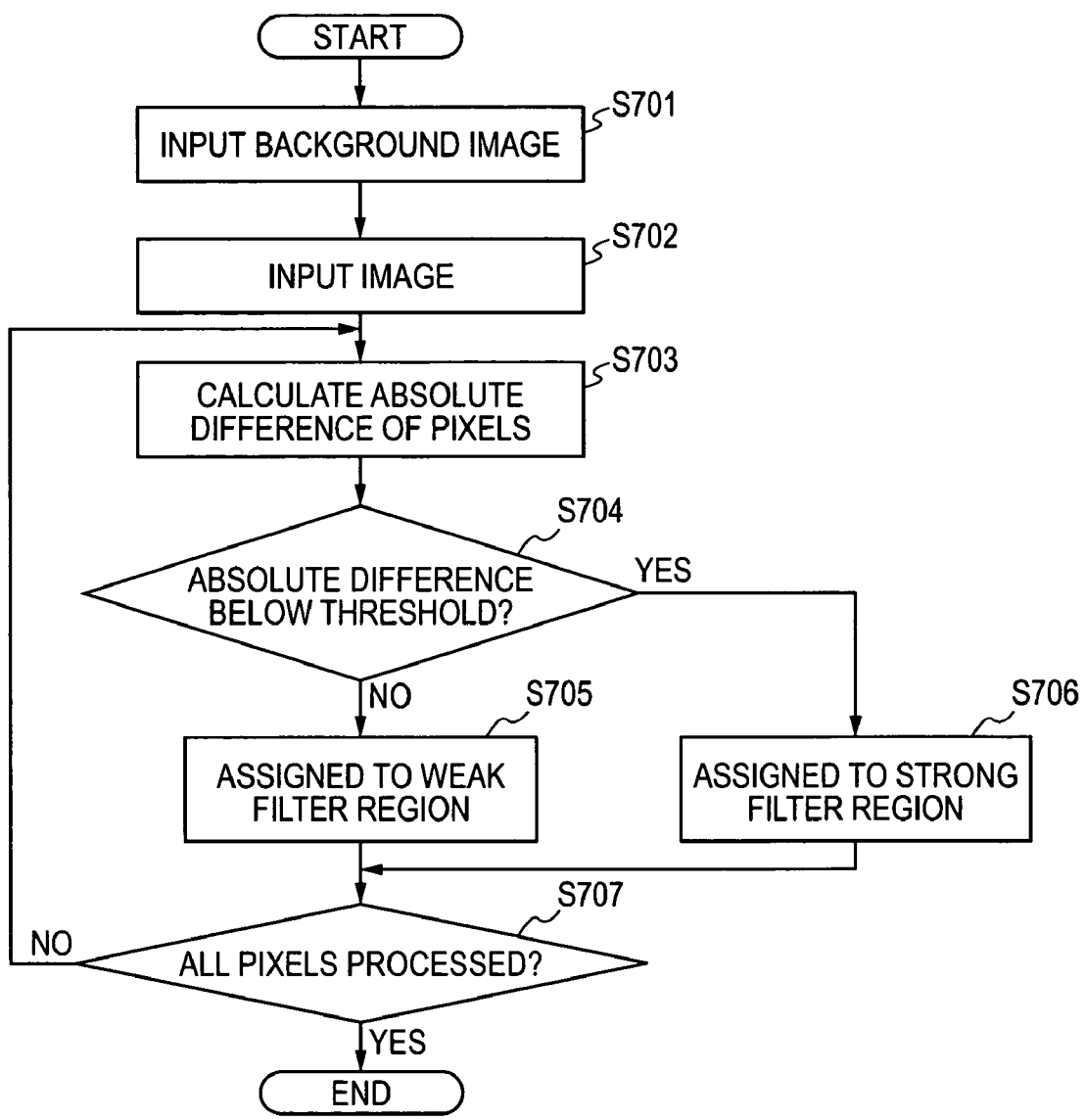
FIG. 11 is a flow chart of a process according to the third embodiment for detecting regions by employing the background subtraction method performed on each pixel.

FIG. 11 is a flow chart of a process of dividing an image into a plurality of regions based on a background subtraction method. A background subtraction method is a method for efficiently dividing an image into regions when a background image can be obtained in advance.

First, in Step S701, a background image is input. Then, in Step S702, a current image is input. The following process is performed on each pixel of the image.

In Step S703, the absolute difference of a pixel in the background image and a corresponding pixel in the current image is calculated. Then, in Step S704, it is determined whether the absolute difference falls below a threshold value. In Step S704, if it is determined that the absolute difference falls below the threshold value, it is determined that the pixels are located in the background. In Step S706, the pixel in the current image is defined as being included in a strong filter region.

In Step S704, if it is determined that the absolute difference exceeds the threshold value, it is determined that the pixel in the current image is included in an object (i.e., not included in the background). In Step S705, it is determined that the pixel is included in a weak filter region where resolution is maintained.

After completing Step S706 or S705, the process proceeds to Step S707 to determine whether all pixels have been processed. In Step S707, if it is determined that all pixels have not been processed, the process is returned to Step S703 and the subsequent steps are repeated. In Step S707, if it is determined that all pixels have been processed, the process for one frame in completed.

Figure 12:
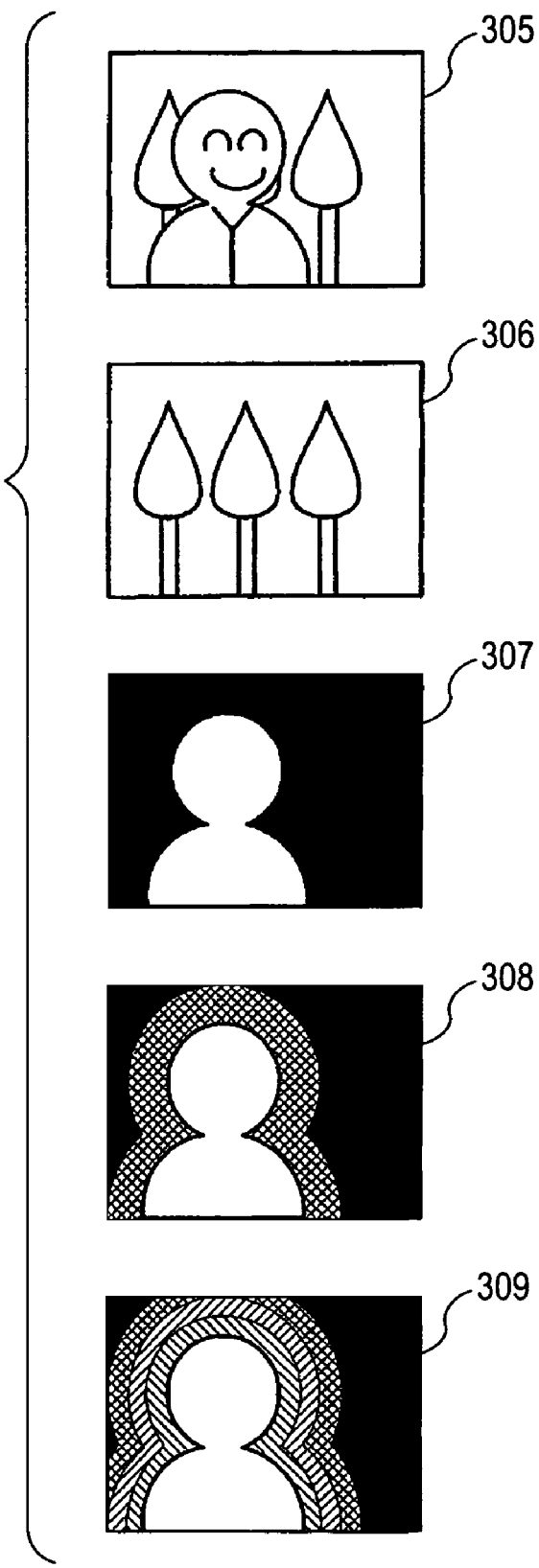
FIG. 12 illustrates image data, divided regions, and generated intermediate regions according to the third embodiment.

As shown in FIG. 12, an image 307 is obtained by calculating the difference between an input image 305 and a background image 306 and detecting the regions having a significant difference as an object. In FIG. 12, the region in white in the image 307 is the region corresponding to the object, whereas the region in black is the background region. By using a weak filter to process the object region, the resolution of the object is prevented from being reduced.

Figure 13:
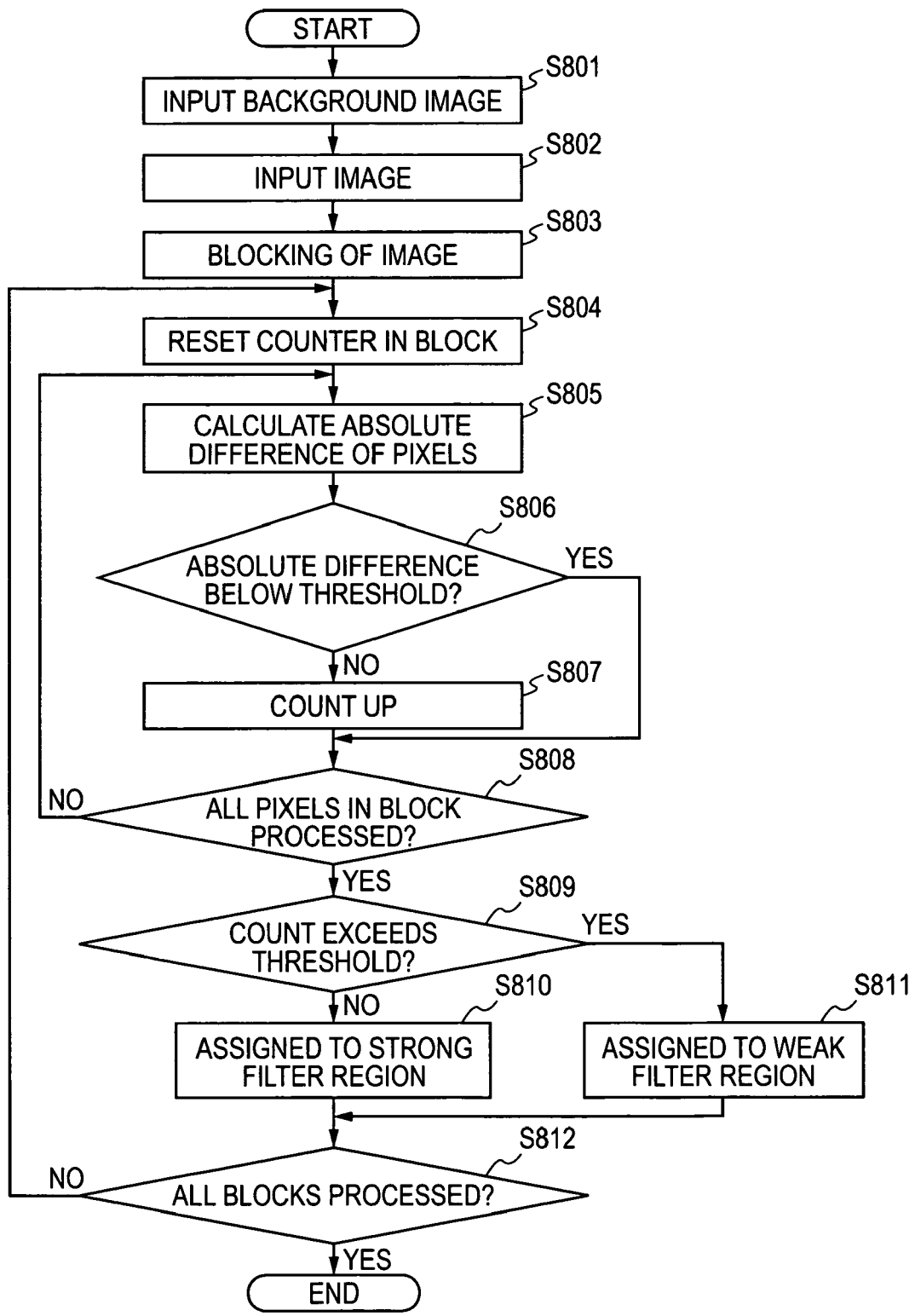
FIG. 13 is a flow chart of a process according to the third embodiment for detecting regions by determining the difference between an object and the background in block units.

FIG. 13 is a flow chart of a process of dividing an image into blocks based on a background subtraction method.

First, in Step S801, a background image is input. Then, in Step S802, a current image is input. In Step S803, the input image is divided into blocks. The following process is performed on each block.

In Step S804, a counter in a block is reset to its initial value, "0." Then, in Step S805, the absolute difference of a pixel in the background image and a corresponding pixel in the current image is calculated. In Step S806, it is determined whether the absolute difference falls below a predetermined threshold value.

If it is determined that the absolute difference is not below the threshold value, it is determined that the pixel is included in the region corresponding to the object. Then, the process proceeds to Step S807, and the counter is increased by one. In Step S806, if it is determined that the absolute difference falls below the threshold value, it is determined that the pixel is included in the background. Then, the process proceeds to Step S808 without increasing the counter.

In Step S808, it is determined whether all pixels in the block are processed. If it is determined that all pixel in the block have not been processed, the process is returned to Step S805 and the subsequent steps are repeated. In Step S808, if it is determined that all pixels in the block have been processed, the process proceeds to Step S809 since processing for the block is completed.

In Step S809, it is determined whether the number counted by the counter exceeds a predetermined threshold value. If the number of counts exceeds the threshold value, the block is defined as a block including many pixels included in the object. Then, the process proceeds to Step S811 to define the block as a weak filter block.

In Step S809, if it is determined that the number of counts does not exceed the threshold value, the process proceeds to Step S810 to define the block as a block including many pixels included in the background. Then, in Step S810, the block is defined as a strong filter block. After the Step S811 or S810 is completed, the process proceeds to Step S812.

In Step S812, it is determined whether all blocks have been processed. If it is determined that all blocks have not been processed, the process is returned to Step S804 and the subsequent steps are repeated. In Step S812, if it is determined that all blocks have been processed, the process for one frame is completed.

Descriptions for the process carried out at an intermediate region setting unit according to this embodiment are the same as the process according to the first embodiment, and are not repeated here.

An image 308 shown in FIG. 12 is obtained by adding one intermediate region to the image 307 as a result of performing the background subtraction method. An image 309 includes three intermediate regions. By changing the filter strength set for these intermediate regions, a drastic change in resolution at the border of the weak filter region and the strong filter region can be prevented.

The steps carried out after completing the process carried out by an filter selecting unit is the same as those carried out after completing the process carried out by the filter selecting unit 114 according to the first and second embodiments. However, when processing a moving image, the target code length does not necessarily have to be set for each frame image. Therefore, it is possible to gradually approach the target code length while processing a plurality of frame images.

According to the third embodiment, when processing a moving image, by dividing an image into regions to be processed with filters based on the coding information and setting the filter strengths for the filters used to process these regions, distortion due to coding can be reduced. Moreover, by providing intermediate regions in regions where resolution is to be maintained, the difference in resolutions of regions where the resolution is maintained and other regions where resolution is reduced can be moderated. In this way, the image will visually appear more natural.

Fourth Embodiment

Now, an image processing apparatus according to a fourth embodiment will be described. According to the first to third embodiments, the number of intermediate regions to be generated is not limited, and the filter strength set for a weak filter region is constant. According to the fourth embodiment, the number of intermediate regions to be generated is limited, and, when the number of intermediate regions exceeds the limit, the filter strength set for a weak filter region is increased.

The overall structure of the image processing apparatus according to the fourth embodiment is the same as that according to the first embodiment illustrated in FIG. 1A if still images are to be processed. If moving images are to be processed, the overall structure is the same as that according to the third embodiment illustrated in FIG. 10. Therefore, descriptions thereof are not repeated here. The image processing apparatus according to the fourth embodiment differs from the image processing apparatus according to the first, second, and third embodiments in that a difference process is carried out by the filter selecting unit. The steps of the process carried out by the filter selecting unit according to the fourth embodiment will be described in detail below with reference to the flow chart in FIG. 14.

First, in Step S1701, it is determined whether the filter strength should be increased. That is, if a generated code amount is over a target code amount, it is determined that the filter strength needs to be increased. If the generated code amount is not over the target code amount, it is determined that the filter strength does not need to be increased. If it is determined that the filter strength does not need to be increased, processing is ended. If it is determined that the filter strength needs to be increased, the process proceeds to Step S1702 to increase the filter strength set for a strong filter region.

In Step S1703, it is determined whether the filter strength set for a strong filter region has been sufficiently increased. In Step S1703, if it is determined that the filter strength does not need to be further increased, the process is ended. If it is determined that the filter strength should be further increased, the process proceeds to Step S1704 to calculate the difference of the filter strengths set for the strong and weak filter regions.

Then, in Step S1705, it is determined whether the difference calculated in Step S1704 exceeds a threshold value. In Step S1705, if it is determined that the difference does not exceed the threshold value, the process is returned to Step S1702 and the subsequent steps are repeated to increase the filter strength set for the strong filter region. When it is determined in Step S1705 that the difference between the filter strengths set of the strong and weak filter regions exceeds the threshold value due to the increase in the filter strength set for the strong filter region, an intermediate filter region is generated and the filter strength of the filter to be used to process the generated intermediate filter region is set, as described below.

In Step S1706, the number of intermediate regions i is reset to the initial value zero (i=0). Then, the process proceeds to Step S1707 to generate an intermediate filter region R(i) (which, at this point of time, is R(0)). An intermediate filter region is generated as described above.

Then, the process proceeds to Step S1708 to increase the filter strength set for the strong filter region. Subsequently, in Step S1709, the filter strength of the intermediate filter region is increased. Next, in Step S1710, it is determined whether the filter strength needs to be increased. If it is determined that the filter strength does not need to be further increased, the process is ended.

In Step S1710, if it is determined that the filter strength needs to be further increased, the process proceeds to Step S1711 to calculate the difference of the filter strengths set for the intermediate filter region R(i) (which, at this point of time, is R(0)) and the weak filter region. In Step S1712, it is determined whether the difference of the filter strengths exceeds a threshold value. If it is determined that the difference does not exceed the threshold value, the process is returned to Step S1708 to increase the filter strengths set for the strong and intermediate filter regions, as described above.

In Step S1712, if the difference exceeds the threshold value, the number of intermediate regions i is increased by one in Step S1713.

Next, in Step S1714, it is determined whether the number of intermediate regions has reached a predetermined maximum value i_max. If the number has not reached the maximum value i_max, the process is returned to Step S1707 and the subsequent steps are repeated as described above until the number of intermediate regions reaches the maximum value i_max.

In Step S1714, if it is determined that the number of intermediate regions has reached the maximum value i_max, Steps S1715 to S1717 are carried out to increase the filter strengths set for the strong, intermediate, and weak filter regions.

More specifically, in Step S1715, the filter strength set for the strong filter region is increased. Then, in Step S1716, the filter strength set for the intermediate filter region is increased. Finally, in Step S1717, the filter strength set for the weak filter region is increased.

In Step S1718, it is determined whether the filter strength should be increased. If it is determined that the filter strength should be increased, the process is returned to Step S1715 and the subsequent steps are repeated as described above. Then, in Step S1718, if it is determined that the filter strength does not need to be further increased, the process is ended. By limiting the number of intermediate regions in this way, the maximum difference in filter strengths set for the strong and weak filter regions can be maintained while the resolution of the entire image is gradually reduced.

Figure 15:
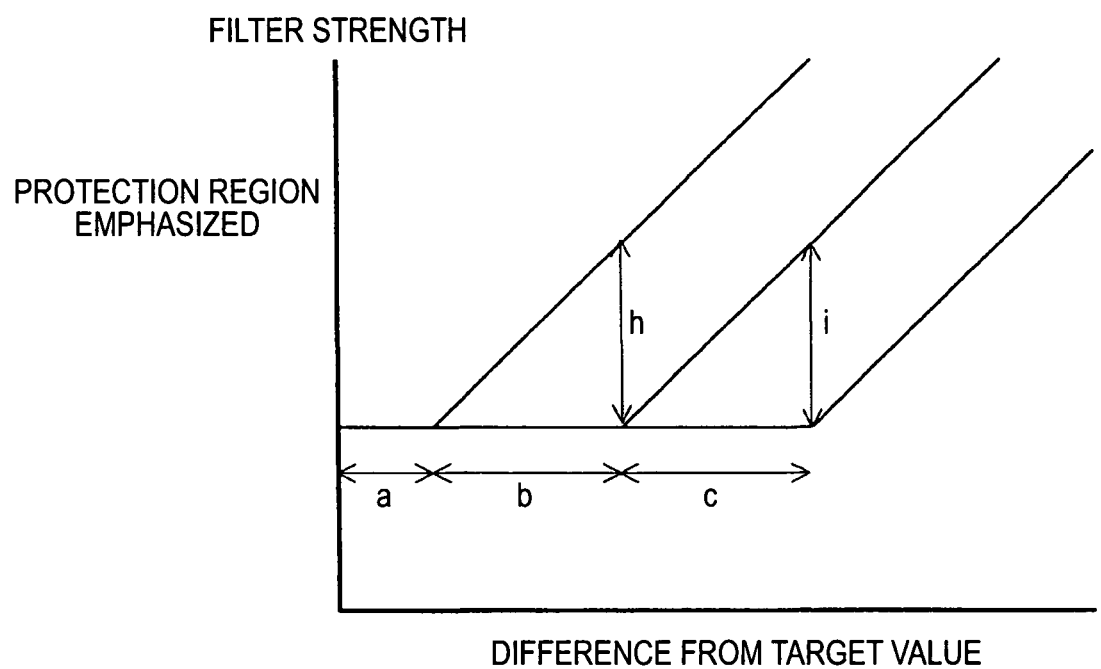
FIG. 15 is a characteristics chart used in a method according to the fourth embodiment for gradually increasing the filter strength.

FIG. 15 is a characteristics chart showing a graph illustrating a method for gradually increasing filter strength. Here, the number of intermediate filters is one. In a first zone a, a filter for reducing the image data is not required. If desired, a weak filter may be used to process the entire image to remove noise. In a second zone b, the filter strength set for the strong filter region is increased. When the difference h between the filter strengths set for the strong and weak filter regions exceeds a threshold value, a new intermediate region is generated and the filter strengths set for the strong and intermediate filter regions are increased.

Since the difference is small in the zone b, an intermediate region does not need to be generated. If the difference in the filter strengths set for the strong and weak filter regions exceeds a threshold value, a new intermediate region is generated. At this time, the difference is h. In a third zone c, the filter strengths set for the strong and intermediate filter regions are increased. When the difference i between the filter strengths set for the intermediate and weak filter regions exceeds a threshold value, the filter strengths set for the strong, intermediate, and weak filter regions are increased in the subsequent zones.

Figure 14:
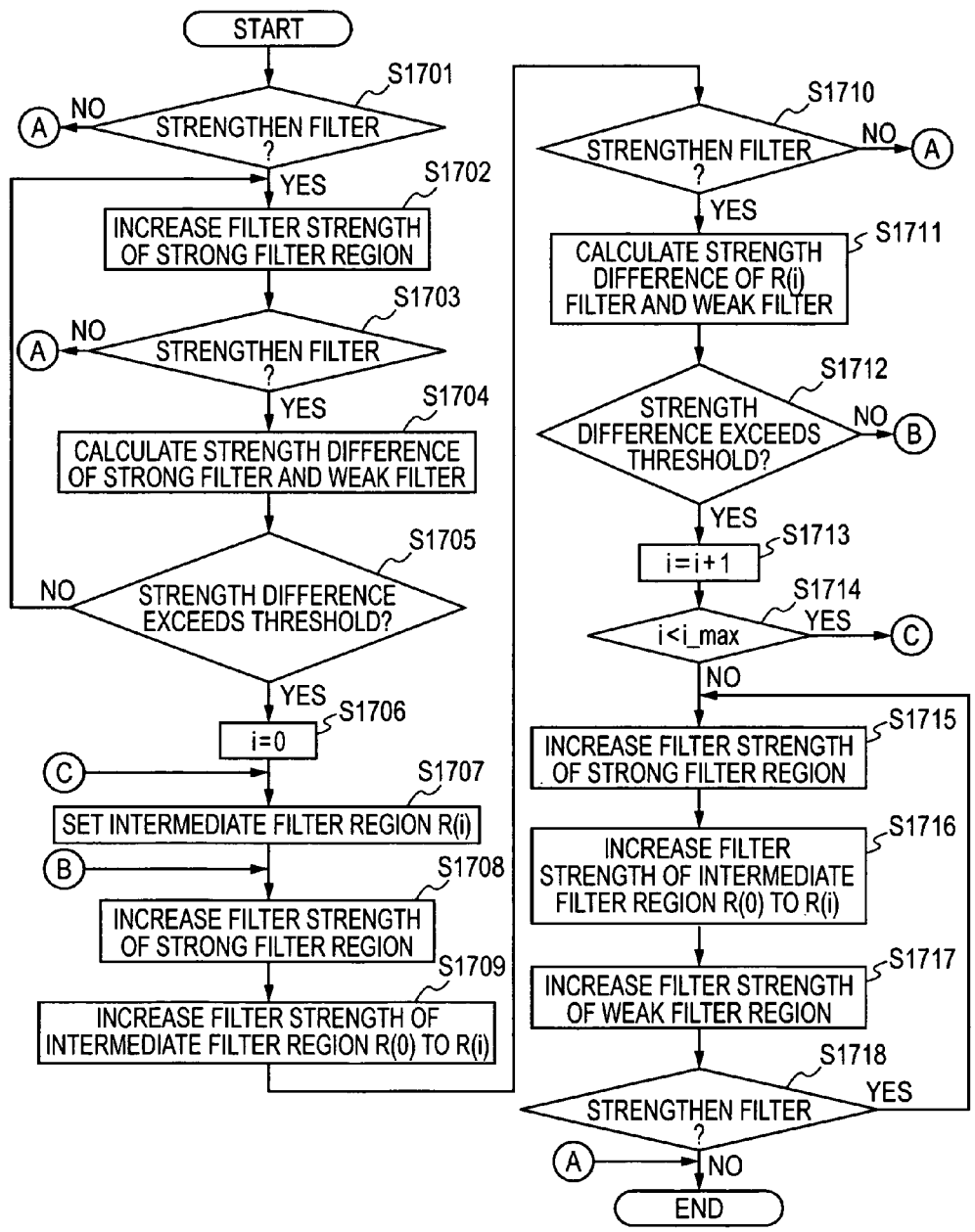
FIG. 14 is a flow chart of a process according to a fourth embodiment for selecting a filter.
Figure 16A:
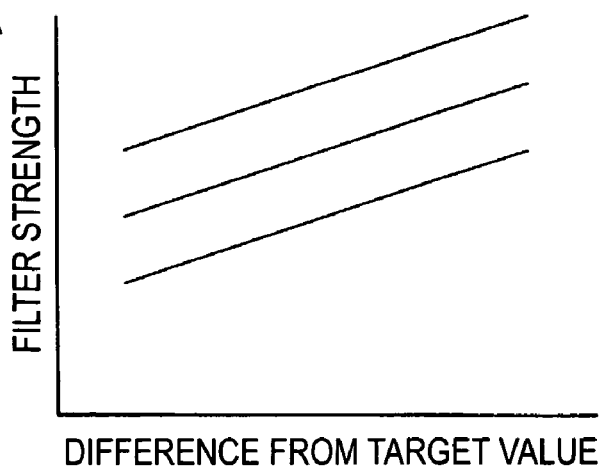
FIGS. 16A, 16B, and 16C are graphs used for setting the filter strength in detail according to the fourth embodiment.

In the process shown in FIGS. 14 and 15, when the differences in filter strengths exceed the threshold values, the differences in filter strengths of the filters are maintained constant. This is illustrated in FIG. 16A. In FIG. 16A, the number of intermediate filter regions is one. The differences in the filter strengths set for the strong, intermediate, and weak filter regions change simultaneously while being maintained at a constant value. The process of controlling the filter strengths will be described below in more detail with reference to the flow charts in FIGS. 17 and 18 of two exemplary cases.

Figure 16B:
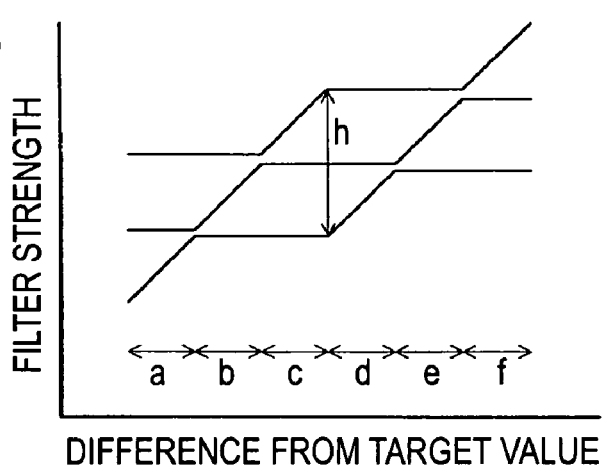
Figure 17:
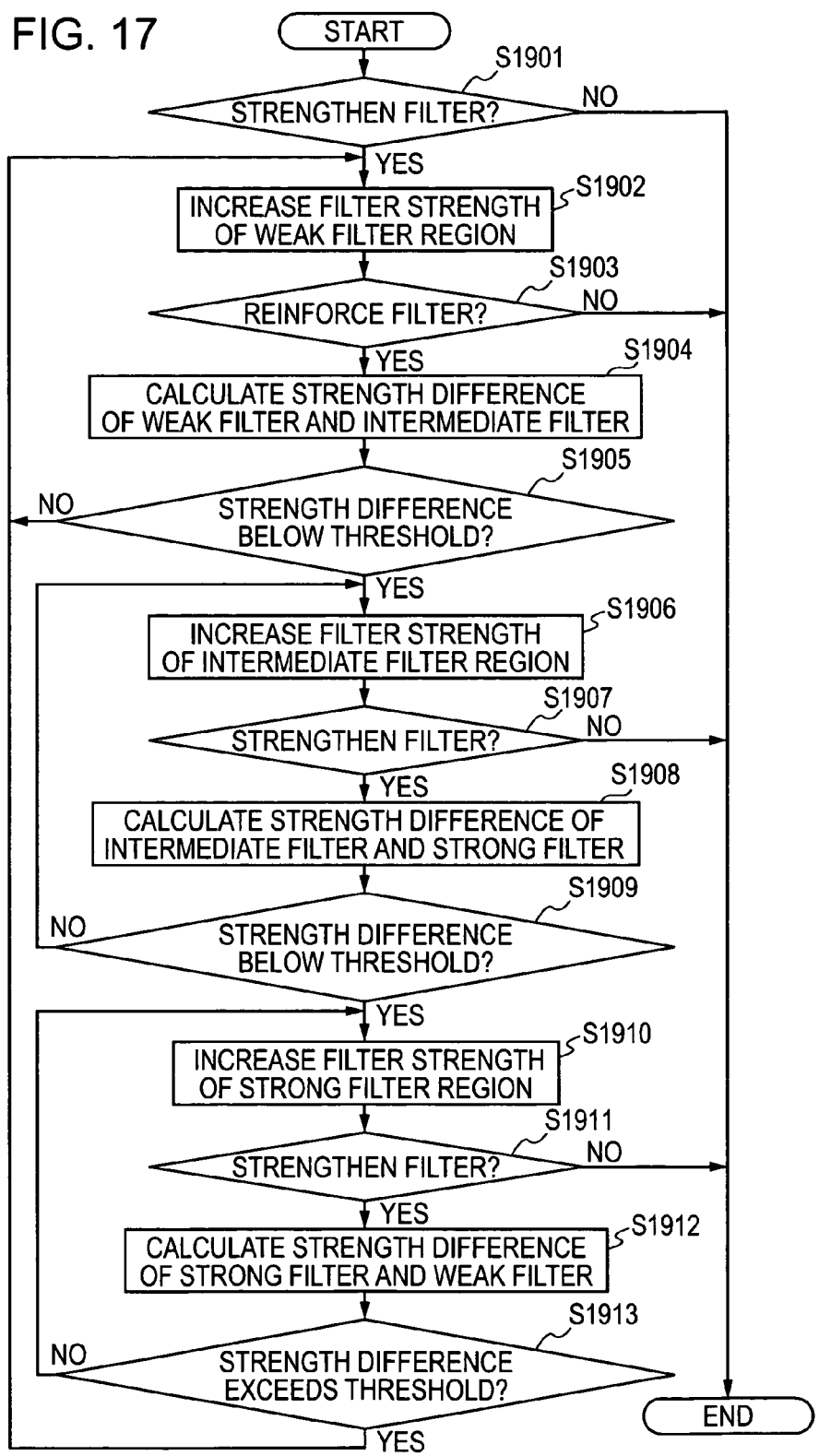
FIG. 17 is a flow chart of the details of a process according to the fourth embodiment for selecting a filter.

FIG. 17 illustrates a flow chart of a process of first increasing the filter strength set for a weak filter region. As shown in FIG. 16B, the difference h in the filter strengths set for the weak and strong filter regions does not increase.

First, in Step S1901, it is determined whether the filter strength needs to be increased. If it is determined that the filter strength does not need to be increased, the process is ended. In Step S1901, if it is determined that the filter strength needs to be increased, the process proceeds to Step S1902 to increase the filter strength set for a weak filter region.

In Step S1903, it is determined whether the filter strength needs to be further increased. If it is determined that the filter strength does not need to be further increased, the process is ended. If it is determined that the filter strength needs to be further increased, the process proceeds to Step S1904 to calculate the difference of the filter strengths set for the weak and intermediate filter regions.

Then, in Step S1905, it is determined whether the difference is below a threshold value. If it is determined that the difference is not below the threshold value, the process is returned to Step S1902 and the subsequent steps are repeated as described above to increase the filter strength set for the weak filter region. At this time, the threshold value is determined on the basis of how much the filter strength set for the weak filter region should come close to the filter strength set for the intermediate filter region to start increasing the filter strength set for the intermediate filter region. A first zone a in FIG. 16B illustrates the above-described process.

In Step S1905, if it is determined that the difference in the filter strengths is below the threshold value, the process proceeds to Step S1906 to increase the filter strength set for the intermediate region. Next, in Step S1907, it is determined whether the filter strength needs to be further increased. If it is determined that the filter strength does not need to be further increased, the process is ended. In Step S1907, if it is determined that filter strength should be further increased, the process proceeds to Step S1908 to calculate the difference in filter strengths set for the intermediate and strong filter regions.

In Step S1909, it is determined whether the difference calculated in Step S1908 falls below a threshold value. If the difference does not fall below the threshold value, the process is returned to Step S1906 to further increase the filter strength set for the intermediate filter region. At this time, the threshold value is determined on the basis of how much the filter strength set for the intermediate filter region should come close the filter strength set for the strong filter region to start increasing the filter strength set for the strong filter region. A first zone b in FIG. 16B illustrates the above-described process.

In Step S1909, if the difference in filter strengths falls below the threshold value, the process proceeds to Step S1910 to increase the filter strength set for the strong filter region. Next, in Step S1911, it is determined whether the filter strength should be further increased. If it is determined that the filter strength does not need to be further increased, the process is ended.

In Step 1911, if it is determined that the filter strength needs to be further increased, the process proceeds to Step S1912 to calculate the difference in the filter strengths set for the strong and weak filter regions. Next, in Step S1913, it is determined whether the difference calculated in Step S1912 exceeds a threshold value. If the calculated difference does not exceed the threshold value, the process is returned to Step S1910 to further increase the filter strength set for the strong filter region.

At this time, the threshold value is determined on the basis of how much the filter strength set for the strong filter region should move apart from the filter strength set for the weak filter region to start increasing the filter strength set for the weak filter region. A first zone c in FIG. 16B illustrates the above-described process, and the difference in filter strengths at this time is h. If it is determined that the difference in filter strengths exceeds the threshold value, the process is returned to Step S1902, and the subsequent steps are repeated until no further increase in the filter strength is required. The same processes carried out in the first zone a, the second zone b, and the third zone c are repeated in a fourth zone d, a fifth zone e, and a sixth zone f, respectively, as shown in FIG. 16B.

Figure 16C:
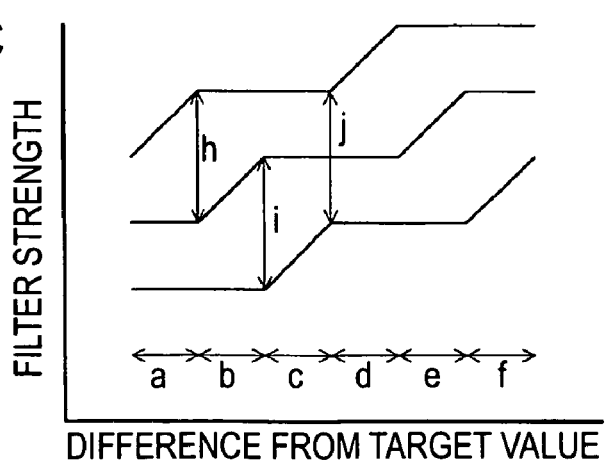

Another exemplary case is described in detail below with reference to the flow chart in FIG. 18 and the characteristics chart in FIG. 16C.

Figure 18:
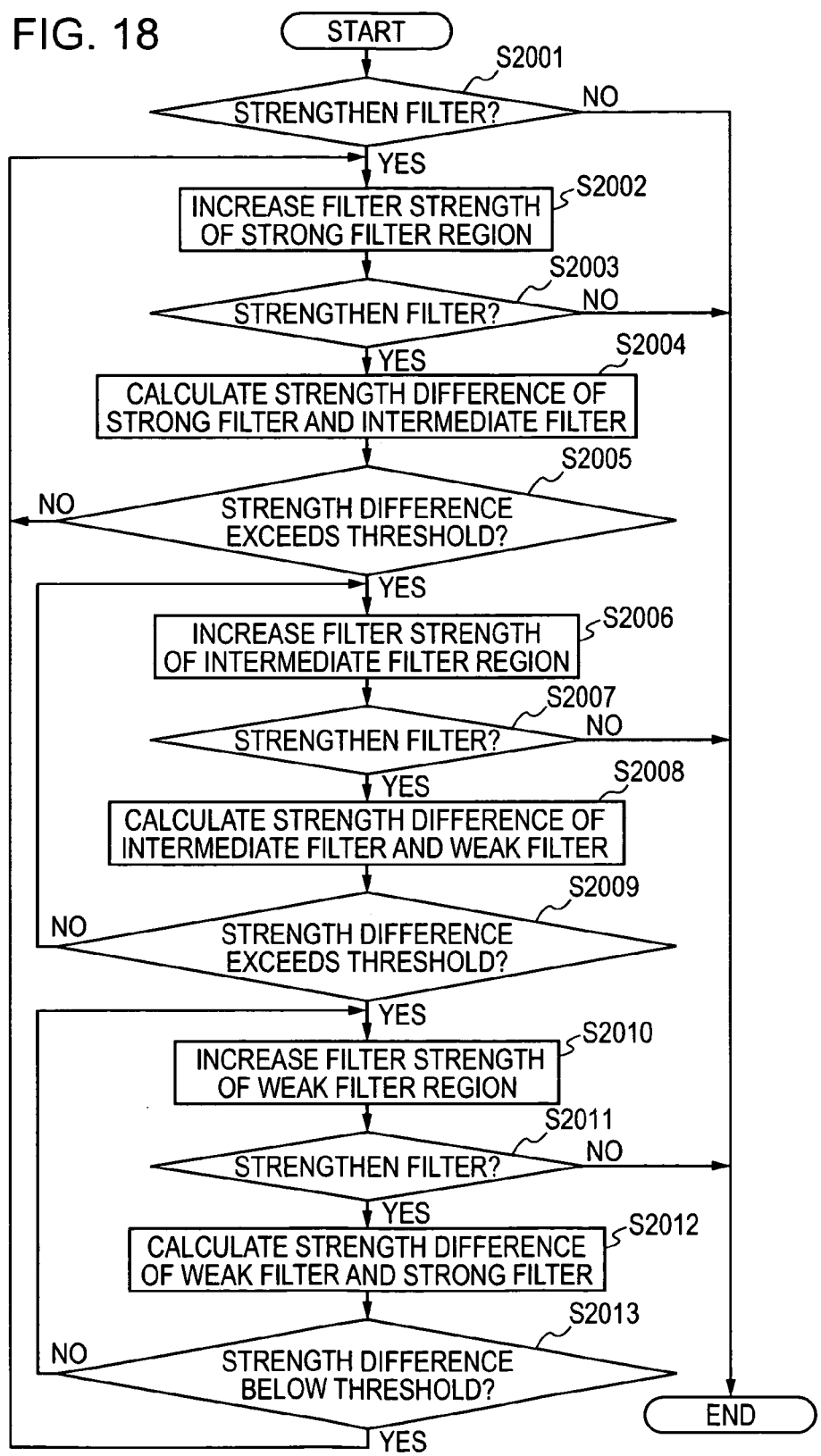
FIG. 18 is a flow chart of the details of a process according to the fourth embodiment for selecting a filter.

FIG. 18 illustrates a flow chart of a process of first increasing the filter strengths set for a strong filter region. As shown in FIG. 16C, the difference in the filter strengths set for adjacent filters does not fall below a constant value.

First, in Step S2001, it is determined whether the filter strength needs to be increased. If it is determined that the filter strength does not need to be increased, the process is ended. If it is determined the filter strength needs to be increased, the process proceeds to Step S2002 to increase the filter strength set for a strong filter region.

In Step S2003, it is determined whether the filter strength needs to be further increased. If it is determined that the filter strength does not need to be further increased, the process is ended. If it is determined that the filter strength needs to be further increased, the process proceeds to Step S2004 to calculate the difference of the filter strengths set for the strong and intermediate filter regions. Then, in Step 2005, if it is determined that the difference does not exceed the threshold value, the process is returned to Step S2002 to increase the filter strength set for the strong filter region. At this time, the threshold value is determined on the basis of how much the filter strength set for the strong filter region should move apart from the filter strength set for the intermediate filter region to start increasing the filter strength set for the intermediate filter region. A first zone a in FIG. 16C illustrates the above-described process, and the filter difference is h.

In Step S2005, if it is determined that the difference in the filter strengths has exceeded the threshold value, the process proceeds to Step S2006 to increase the filter strength set for the intermediate region. Next, in Step S2007, it is determined whether the filter strength should be further increased. If it is determined that the filter strength does not need to be further increased, the process is ended. If it is determined that filter strength needs be further increased, the process proceeds to Step S2008 to calculate the difference in filter strengths set for the intermediate and weak filter regions.

In Step S2009, it is determined whether the difference calculated in Step S2008 exceeds a threshold value. If it is determined that the difference has not exceeded the threshold value, the process is returned to Step S2006 and the subsequent steps are repeated to further increase the filter strength set for the intermediate filter region. At this time, the threshold value is determined on the basis of how much the filter strength set for the intermediate filter region should move apart from the filter strength set for the weak filter region to start increasing the filter strength set for the weak filter region. A first zone b in FIG. 16C illustrates the above-described process, and the filter difference is i.

In Step S2009, if the difference in filter strengths exceeds the threshold value, the process proceeds to Step S2010 to increase the filter strength set for the weak filter region. Next, in Step S2011, it is determined whether the filter strength needs to be further increased. If it is determined that the filter strength does not need to be further increased, the process is ended. If it is determined that the filter strength should be further increased, the process proceeds to Step S2012 to calculate the difference in the filter strengths set for the weak and strong filter regions.

In Step S2013, it is determined whether the difference falls below a threshold value. If the calculated difference does not fall below the threshold value, the process is returned to Step S2010 to further increase the filter strength set for the weak filter region. At this time, the threshold value is determined on the basis of how much the filter strength set for the weak filter region should come close to the filter strength set for the strong filter region to start increasing the filter strength set for the strong filter region. A first zone c in FIG. 16C illustrates the above-described process, and the difference in filter strengths at this time is j.

In Step S2013, if it is determined that the difference in filter strengths falls below the threshold value, the process is returned to Step S2002, and the subsequent steps are repeated until no further increase in the filter strength is required. The same processes carried out in the first zone a, the second zone b, and the third zone c are repeated in a fourth zone d, a fifth zone e, and a sixth zone f, respectively, as shown in FIG. 16C.

According to the fourth embodiment, by dividing an image into regions to be processed with filters based on the coding information and setting the filter strengths for the filters used to process these regions, distortion due to coding can be reduced. Moreover, by providing intermediate regions in regions where resolution is to be maintained, the difference in resolutions of regions where the resolution is maintained and other regions where resolution is reduced can be moderated. In this way, the image will visually appear more natural.

Fifth Embodiment

Now, an image processing apparatus according to a fifth embodiment will be described. Since the overall structure of the processing apparatus according to the fifth embodiment is the same as that according to the third embodiment, as shown in FIG. 10, descriptions thereof are not repeated here.

Figure 19:
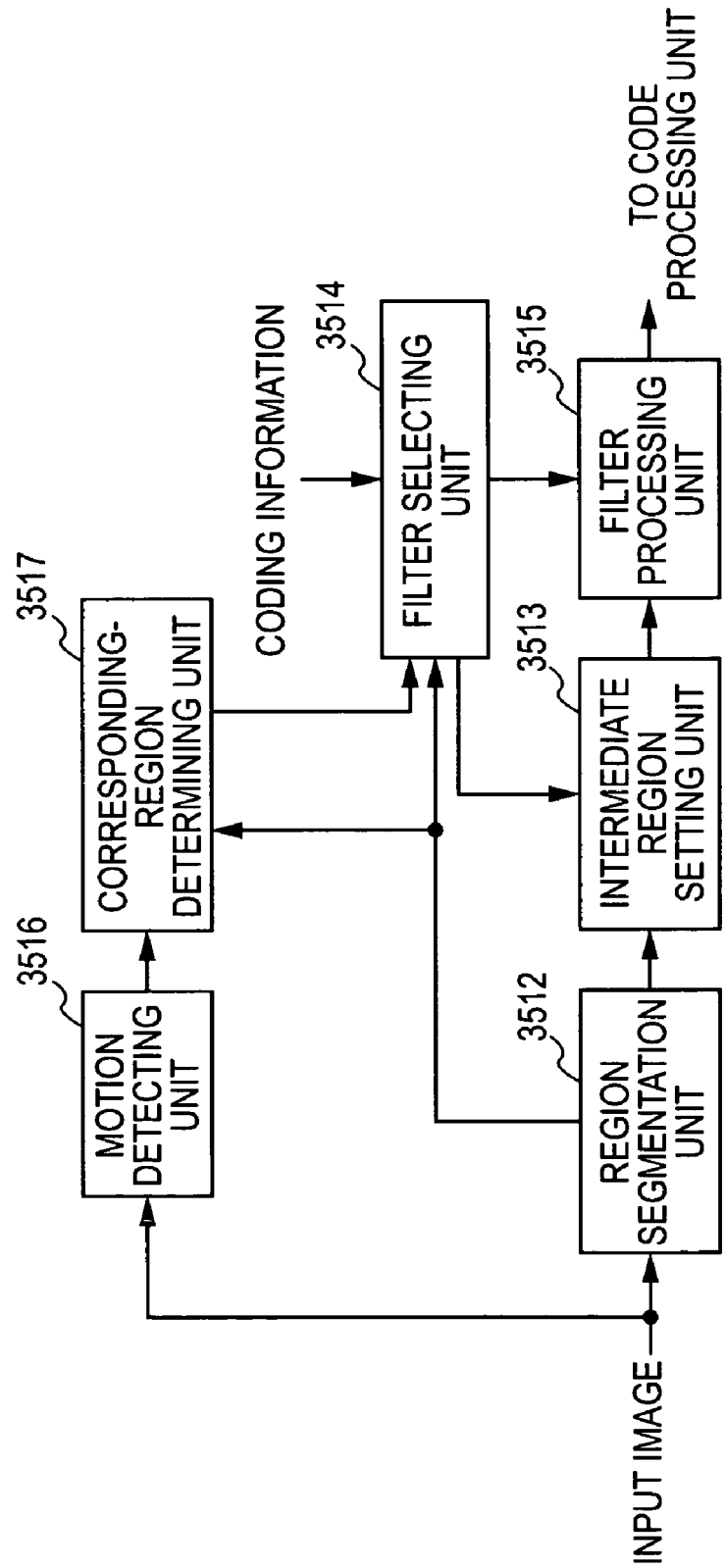
FIG. 19 is block diagram illustrating an image processing apparatus according to a fifth embodiment.

FIG. 19 is a block diagram illustrating the structure of a pre-processing unit according to the fifth embodiment.

The difference between the pre-processing unit according to the fifth embodiment and pre-processing unit according to the third embodiment is that motion data is used to control the filter regions and the filter strengths in accordance with the continuity of regions corresponding in adjacent frame images.

A motion detecting unit 3516 detects motion in adjacent frame images. A corresponding-region determining unit 3517 detects corresponding-regions divided by a region segmentation unit 3512 in adjacent frame images on the basis of the results from the motion detecting unit 3516. Information on the corresponding-regions is input to a filter selecting unit 3514 and is used as control information for generating intermediate regions using an intermediate region setting unit 3513. A filter processing unit 3515 uses filters corresponding to the filter regions in a frame image to process these filter regions. Then, a filtered image is output. The processes carried out by the region segmentation unit 3512 and the intermediate region setting unit 3513 are the same as those carried out by the region segmentation unit 112 and the intermediate region setting unit 113, respectively, according to the third embodiment, as shown in FIG. 1.

The process of detecting divided regions corresponding to each other in adjacent frame images will be described below with reference to the flow chart in FIG. 20.

In Step S1201, a previous frame image is input. Next, in Step S1202, a current frame image is input. Then, in Step S1203, motion vectors indicating how much the current frame image has moved with respect to the previous frame image are calculated.

In Step S1204, the motion vectors calculated in Step S1203 are used to align corresponding-regions. Then, in Step S1205, the degree of matching of the corresponding-regions is determined. If the regions match well, it is determined that the regions correspond to each other, and the process proceeds to Step S1207 to define these regions as continuous regions. On the other hand, in Step S1205, if it is determined that the regions do not match well, it is determined that the regions do not correspond to each other, and the process proceeds to Step S1206 to assign this region in the current frame image as a new region.

Figure 21:
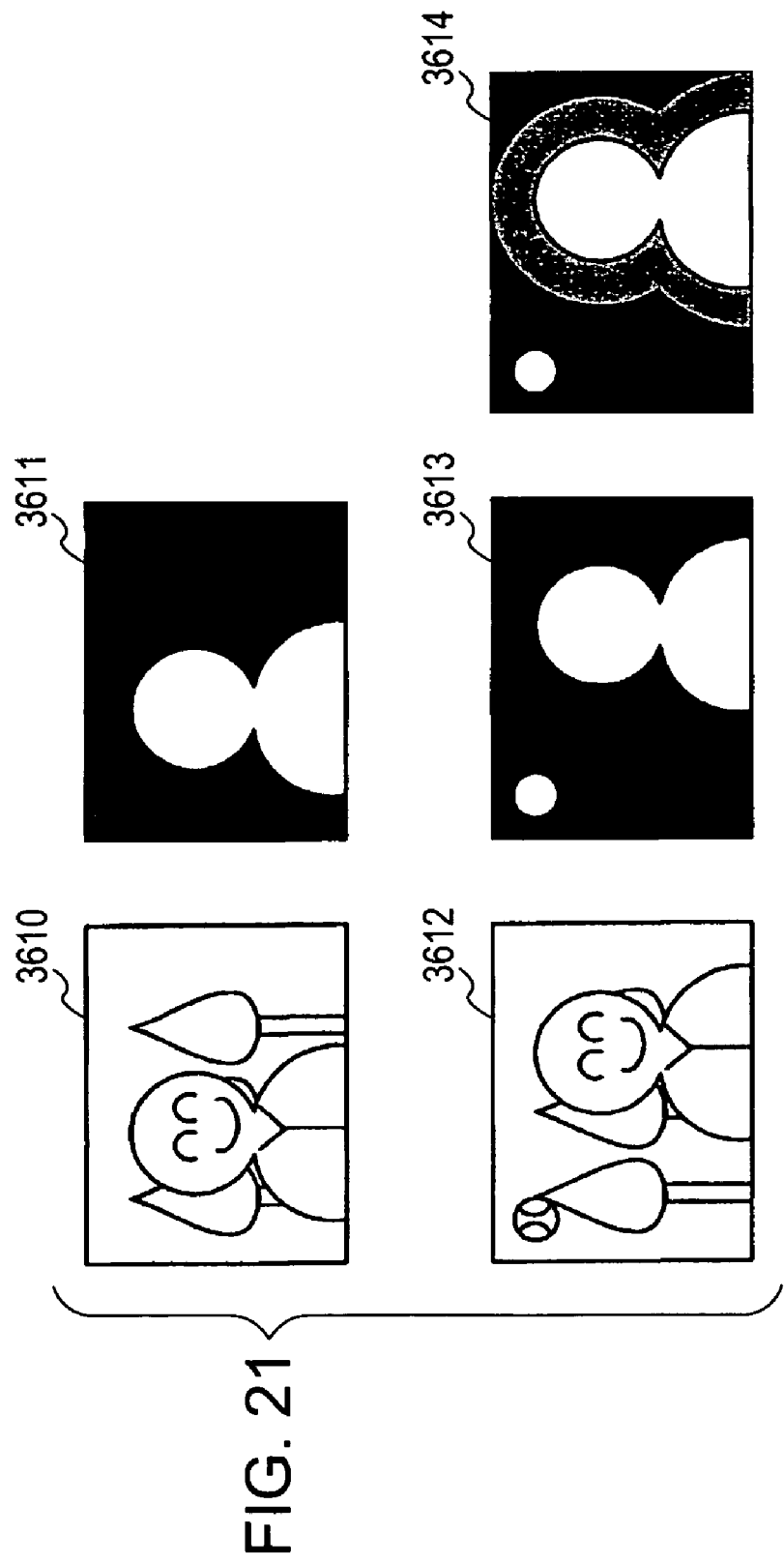
FIG. 21 illustrates image data, divided regions, and generated intermediate regions according to the fifth embodiment.

FIG. 21 shows a previous frame image 3610. An image 3611 is obtained by dividing the previous frame image 3610 into a plurality of regions. A current frame image 3612 is also shown. An image 3613 is obtained by dividing the current frame image 3612 into a plurality of regions.

Figure 20:
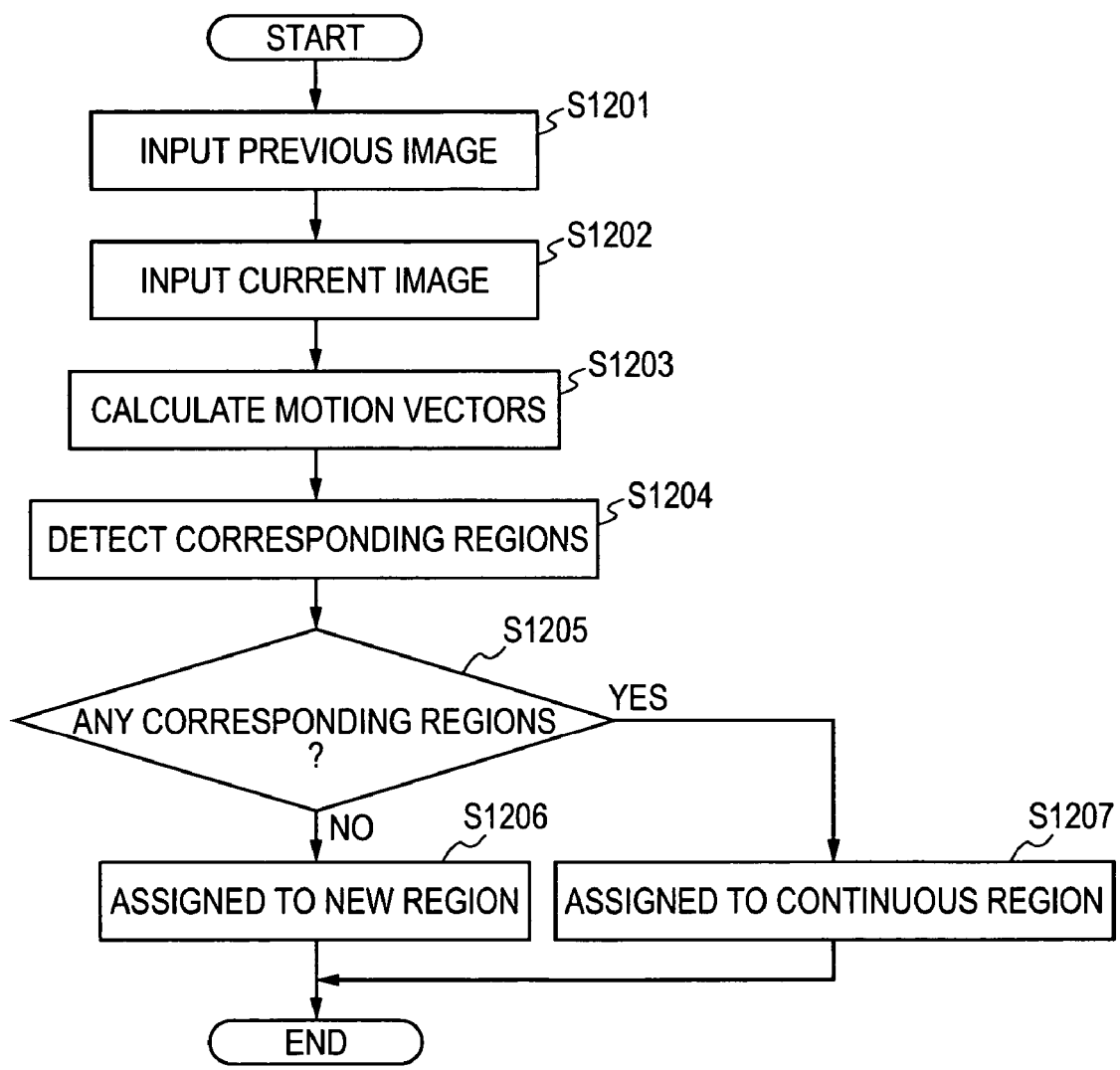
FIG. 20 is a flow chart of a process according to a fifth embodiment for determining regions corresponding in adjacent frames.

According to the process shown in FIG. 20, the region representing a person in the current frame image has a corresponding region in the previous frame image. Therefore, this region is defined as a continuous region. On the other hand, the region representing a ball in the current frame image does not have a corresponding region in the previous frame image. Therefore, this region is defined as a new region. A frame image 3614 includes an intermediate region provided for the continuous region.

According to this embodiment, the weight applied to the region defined as a weak filter region is changed depending on the continuity of the regions. In this way, an order of priority may be posed on the filter strengths.

A process carried out by the filter selecting unit to protect a continuous region defined as a weak filter region will be described with reference to a flow chart in FIG. 22.

In Step S2101, it is determined whether the filter strength needs to be increased. If it is determined that the filter strength does not need to be increased, the process is ended. If it is determined that the filter strength should be increased, the process proceeds to Step S2102 to increase the filter strength set for the new region.

Next, in Step S2103, it is determined whether the filter strength needs to be further increased. If it is determined that filter strength does not need to be increased, the process is ended. If it is determined that the filter strength needs to be further increased, the process proceeds to Step S2104 to calculate the difference in the filter strengths set for the new region and the continuous region.

In Step S2105, it is determined whether the difference falls below a threshold value. If the difference falls below the threshold value, the process is returned to Step S2102 to further increase the filter strength set for the new region. At this time, the threshold value is determined on the basis of how much the filter strength set for the new region should move apart from the filter strength set for the continuous filter region to start increasing the filter strength set for the continuous region.

In Step S2105, if it is determined that the difference is not below the threshold value, the process proceeds to Step S2106 to increase the filter strength set for the new region. Then, the process proceeds to Step S2107 to increase the filter strength set for the continuous region.

Next, in Step S2108, it is determined whether the filter strength needs to be further increased. If it is determined that the filter strength does not have to be further increased, the process is ended. In Step S2108, if it is determined that the filter strength needs to be further increased, the process proceeds to Step S2109 to calculate the difference in the filter strengths set for the continuous region and an intermediate region. At this time, the threshold value is determined on the basis of how much the filter strength set for the continuous region should come close to the filter strength set for the intermediate filter region to start increasing the filter strength set for the intermediate filter region.

In Step S2110, it is determined whether the difference falls below the threshold value. If the difference does not fall below the threshold value, the process is returned to Step S2106, and the subsequent steps are repeated to further increase the filter strengths set for the continuous and new regions, as described above. In Step S2110, if the difference falls below the threshold value, the process is ended once because the filter strength set for the intermediate filter region should be increased.

Figure 22:
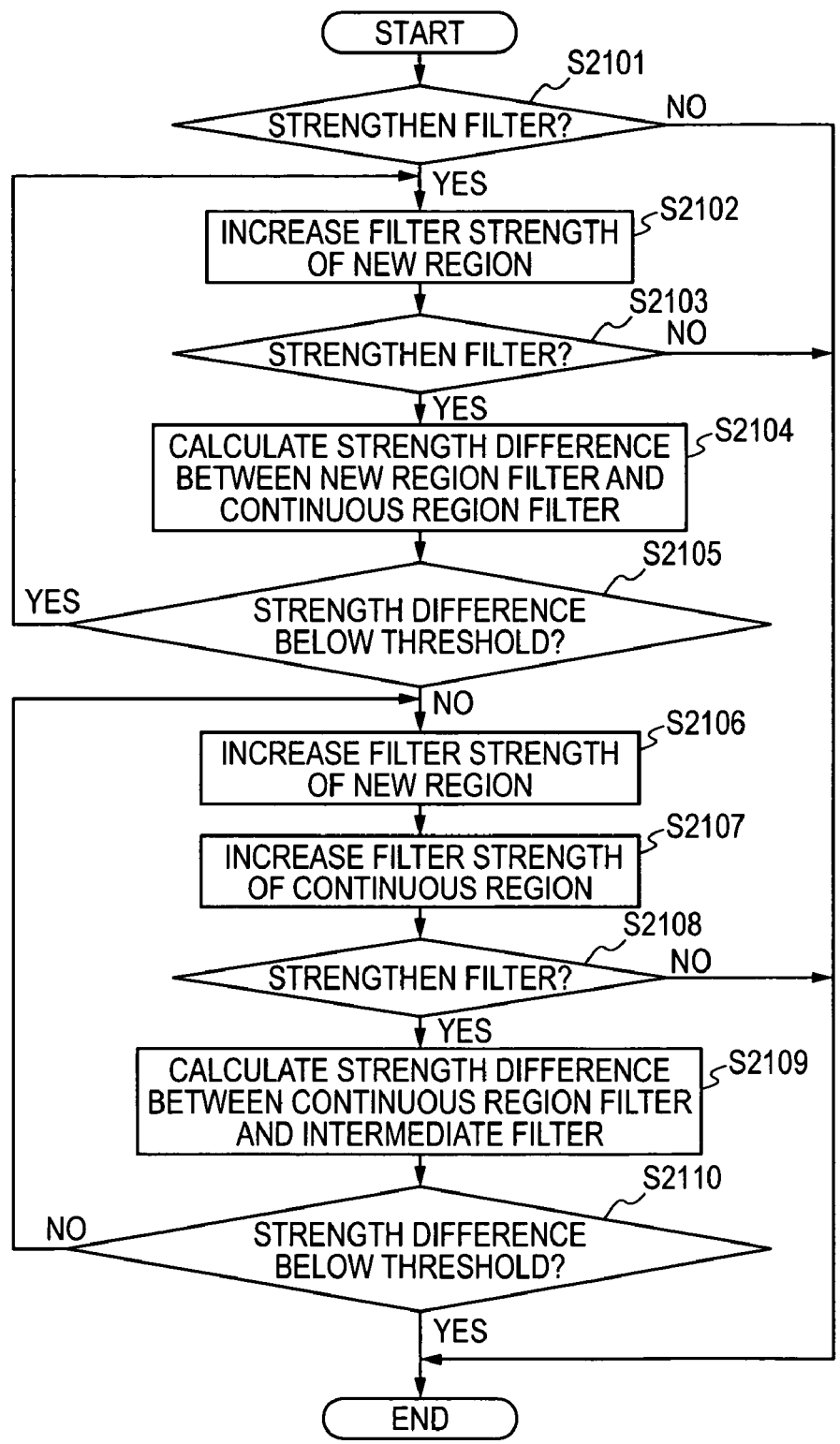
FIG. 22 is a flow chart of a process according to the fifth embodiment for filter selection with priority on continuous regions.
Figure 23:
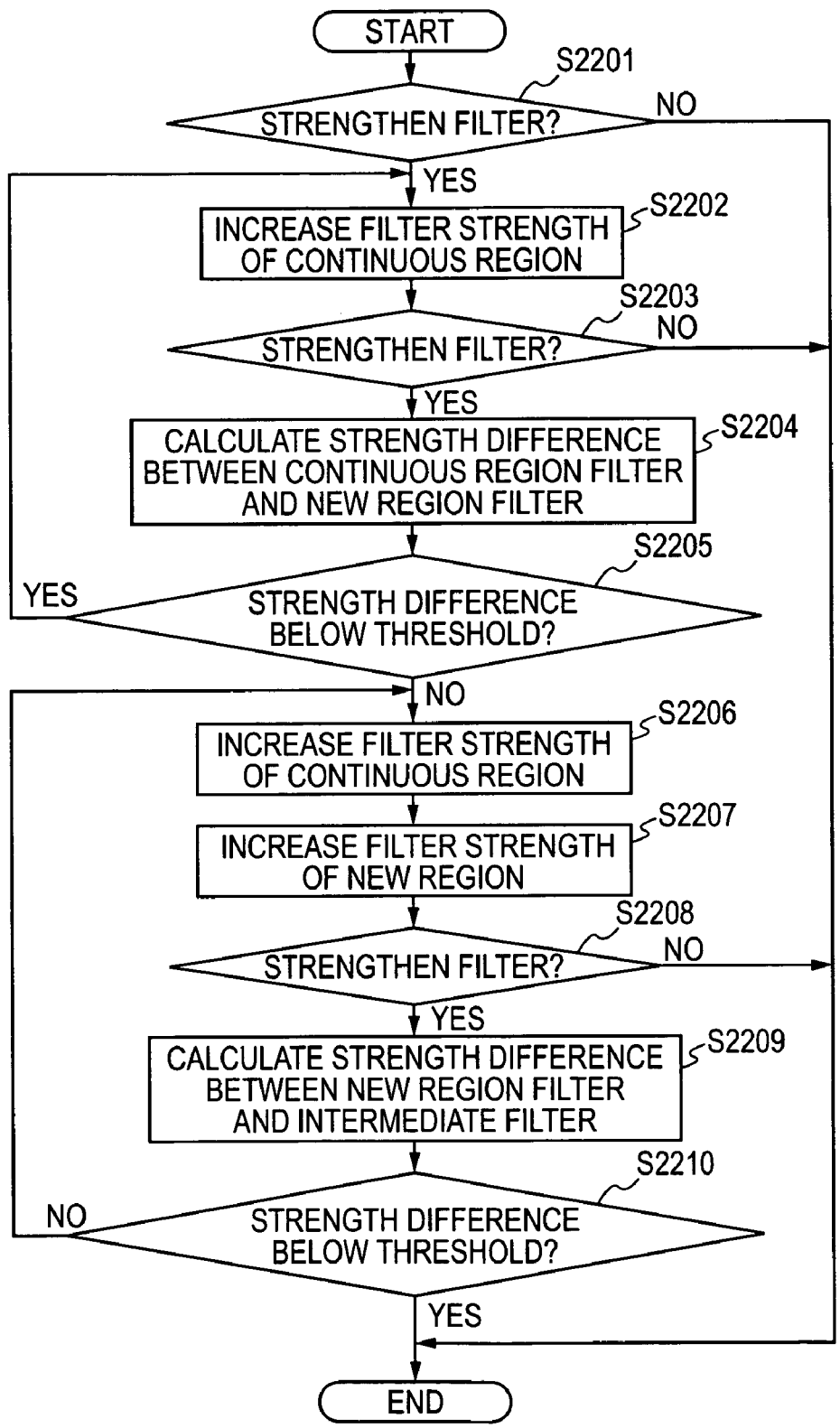
FIG. 23 is a flow chart of a process according to the fifth embodiment for selecting a filter with priority on continuous regions.

FIG. 23 is a flow chart of a process carried out by the filter selecting unit to protect a new region defined as a weak filter region, contrary to the process in FIG. 22.

First, in Step S2201, it is determined whether the filter strength needs to be increased. If it is determined that the filter strength does not need to be increased, the process is ended. If it is determined that the filter strength needs to be increased, the process proceeds to Step S2202 to increase the filter strength set for the continuous region.

Next, in Step S2203, it is determined whether the filter strength needs to be further increased. If it is determined that filter strength does not need to be increased, the process is ended. If it is determined that the filter strength is required to be further increased, the process proceeds to Step S2204 to calculate the difference in the filter strengths set for the continuous and new regions.

In Step S2205, it is determined whether the difference falls below a threshold value. If the difference falls below the threshold value, the process is returned to Step S2202 to further increase the filter strength set for the continuous region. At this time, the threshold value is determined on the basis of how much the filter strength set for the continuous region needs to move apart from the filter strength set for the new region to start increasing the filter strength set for the continuous region.

In Step S2205, if it is determined that the difference is not below the threshold value, the process proceeds to Step S2206 to increase the filter strength set for the continuous region. Then, the process proceeds to Step S2207 to increase the filter strength set for the new region.

In Step S2208, it is determined whether the filter strength needs to be further increased. If it is determined that the filter strength does not need to be further increased, the process is ended. In Step S2208, if it is determined that the filter strength needs to be further increased, the process proceeds to Step S2209 to calculate the difference in the filter strengths set for the new region and an intermediate region. At this time, the threshold value is determined on the basis of how much the filter strength set for the continuous region needs to come close to the intermediate filter region to start increasing the filter strength set for the intermediate filter region.

In Step S2210, it is determined whether the difference falls below the threshold value. If the difference does not fall below the threshold value, the process is returned to Step S2206, and the subsequent steps are repeated to further increase the filter strengths set for the continuous and new regions, as described above. In Step S2110, if the difference falls below the threshold value, the process is ended once because the filter strength set for the intermediate filter region should be increased.

According to the fifth embodiment, by dividing an image into regions to be processed with filters based on the coding information and setting the filter strengths for the filters used to process these regions, a coding system capable of producing coded images including only a moderate degree of distortion can be realized. Moreover, by generating intermediate regions including motion information in addition to filter strength settings, images will appear visually more natural.

Sixth Embodiment

Now, an image processing apparatus according to a sixth embodiment will be described. Image processing apparatuses according to the sixth to eighth embodiments are capable of coding an image in a highly efficient manner while reducing visible distortion even when some of the frame images capture light from a flash. The structure of the image processing apparatuses according to the sixth to eighth embodiments is that same as that according to the third embodiment shown in FIG. 10, and, thus, descriptions thereof are not repeated here.

Figure 24:
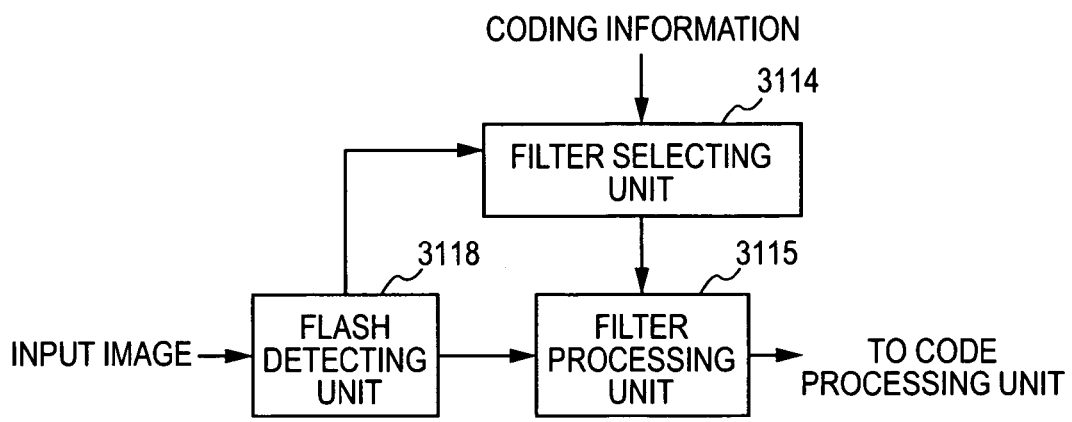
FIG. 24 is block diagram illustrating an image processing apparatus according to a sixth embodiment.

According to the sixth embodiment, an output from a pre-processing unit 3001 is controlled on the basis of information from a rate controlling unit 3011. Details of the sixth embodiment are illustrated in FIG. 24.

First, a flash detecting unit 3118 determines whether the input image has captured light from a flash. The result of the flash detecting unit 3118 is sent to a filter selecting unit 3114. The filter selecting unit 3114 sets the filter characteristics of the image based on information from a rate controlling unit 3011 and the flash detecting unit 3118. A filter processing unit 3115 uses filters corresponding to the filter regions in a frame image to process these filter regions. Then, a filtered image is output.

Figure 25:
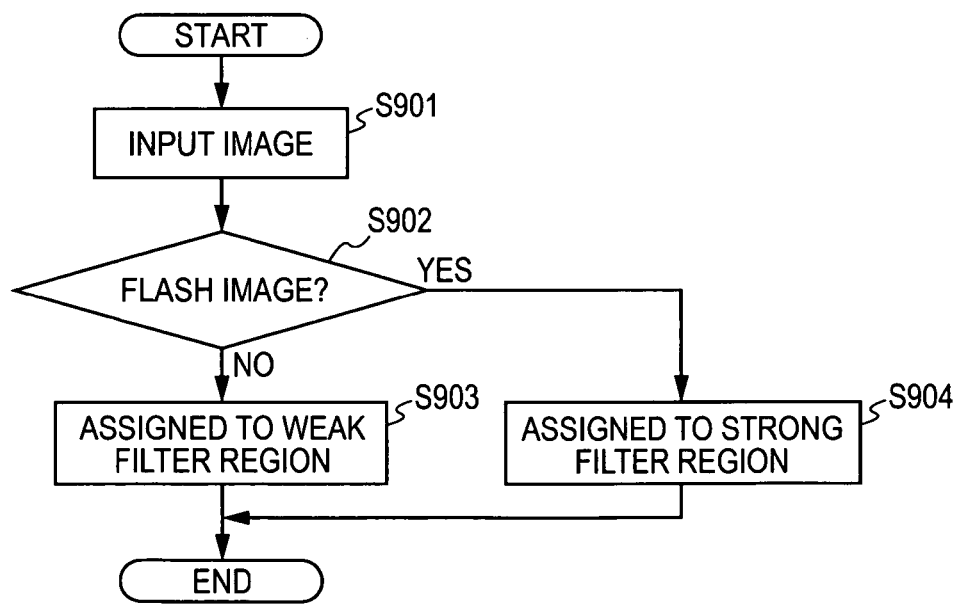
FIG. 25 is a flow chart of a process according to the sixth embodiment for setting a frame.

The basic process of filter selection is described below with reference to FIG. 25.

First, in Step S901, a frame image is input. Then, in Step S902, it is determined whether the input frame image has captured light from a flash. If it is determined that the frame image has captured light from a flash, the process proceeds to Step S904 and the frame image is defined as a strong filter frame. In Step S902, if it is determined that the frame image has not captured light from a flash, the process proceeds to Step S903 and the frame image is defined as a weak filter frame.

Figure 26:
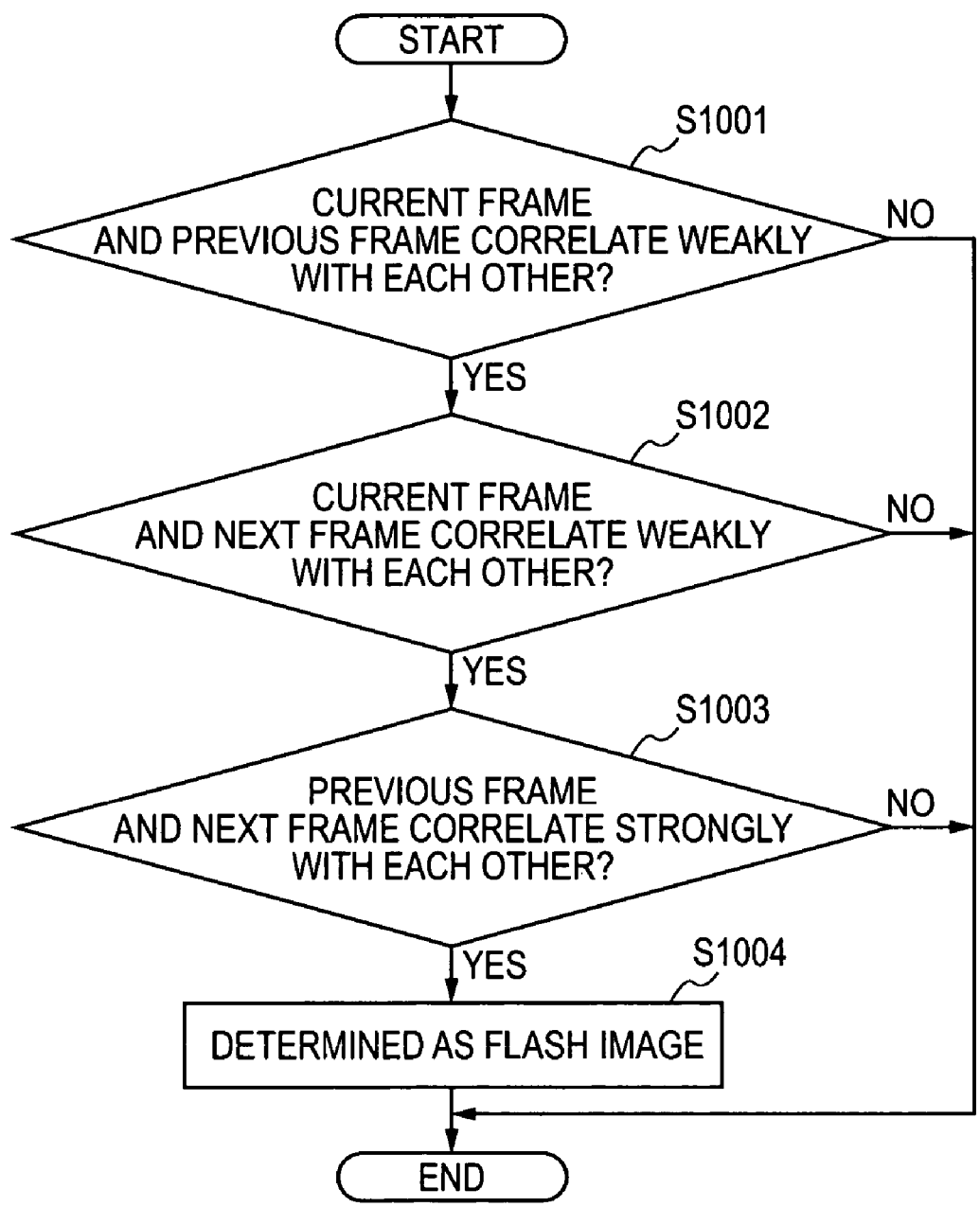
FIG. 26 is a flow chart of a process according to the sixth embodiment for detecting a flash frame.
Figure 27:
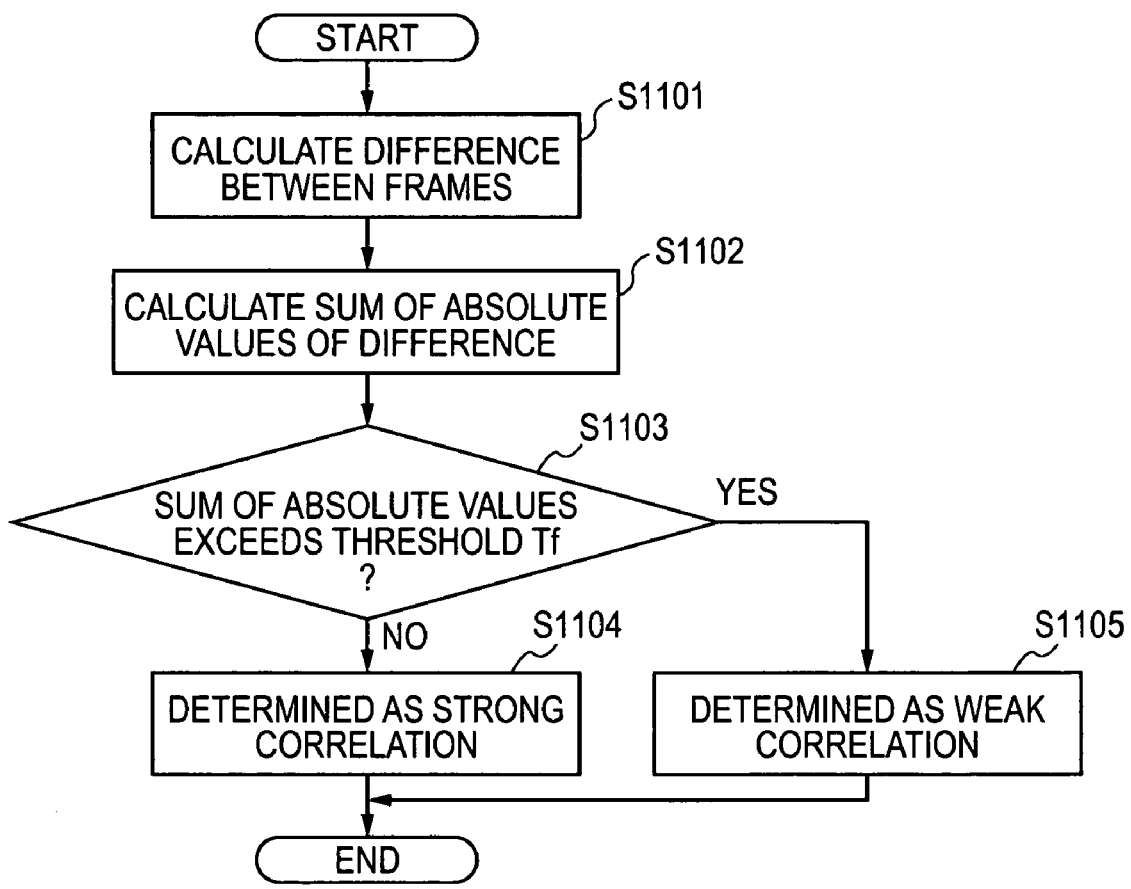
FIG. 27 is a flow chart of a process according to the sixth embodiment for detecting a flash image.

The process of detecting a frame image that has captured light from a flash is described below with reference to FIGS. 26 and 27.

Since a frame image that has captured light from a flash has a weak correlation with its previous frame image and its subsequent frame image, this reduction in the degree of correlation can be detected. More specifically, as shown in Step S1001 in the flow chart in FIG. 26, the degree of correlation between a current frame image and a previous frame image is detected.

In Step S1001, if a strong correlation is detected, processing ends. In Step S1001, if only a weak correlation is detected, it is concluded that the current frame image has captured light from a flash, and the process proceeds to Step S1002 to determine the degree of correlation between the current and subsequent frame images. If the current and subsequent frame images correlate strongly, it is highly possible that there has been a change in the scene. Therefore, the process is ended after concluding that the current frame image has not captured light from a flash.

Thus, if in Step S1002 it is determined that a strong correlation between the current and subsequent frame images is detected, the process is ended. If a weak correlation is detected, the process proceeds to Step S1003 to determine whether the previous frame image and the subsequent frame image correlate to each other.

In Step S1003, if a strong correlation between the previous and subsequent frame images is detected, the process proceeds to Step S1004 to conclude that the current frame image has captured light from a flash. In Step S1003, if it is determined that the correlation between the previous frame image and the subsequent frame image is not strong, the process is ended because it can be assumed that there is no continuity in the scenes.

The process of detecting a correlation between frame images is described below with reference to FIG. 27.

In Step S1101, the differences in the frame images are calculated. Next, in Step S1102, the absolute sum of the differences is calculated. Then, in Step S1103, it is determined whether the calculated absolute sum exceeds a predetermined threshold value Tf.

In Step S1103, if it is determined that the calculated absolute sum exceeds the threshold value Tf, the process proceeds to Step S1105 and it is concluded that the correlation between the frame images is weak. In Step S1103, if the calculated absolute sum falls below the threshold value Tf, the process proceeds to Step S1104 and it is concluded that the correlation between the frame images is strong. When the motion in adjacent frame images is detectable, highly accurate results can be obtained if the frame images are aligned in accordance of the amount of movement before calculating the differences.

Figure 28:
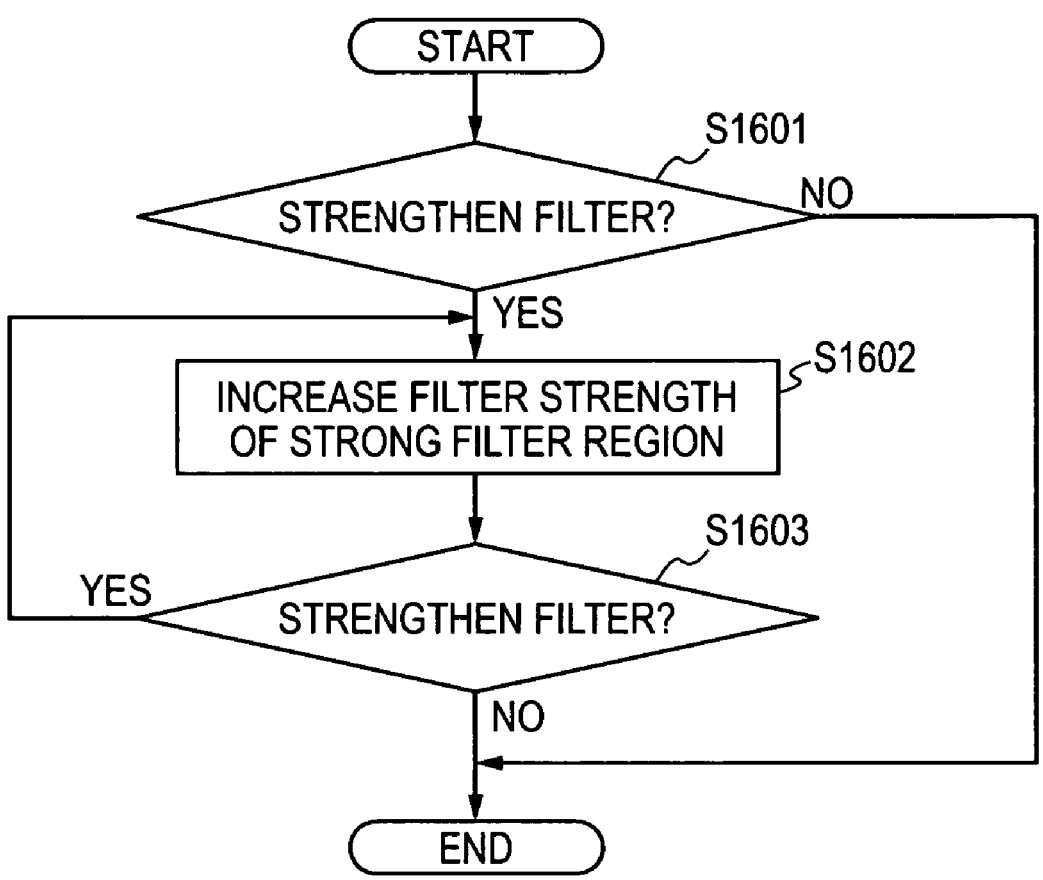
FIG. 28 is a flow chart of a process according to the sixth embodiment for selecting a filter.

The process of setting the filter strength for a frame image that has captured light from a flash will be described below with reference to FIG. 28.

First, in Step S1601, it is determined whether the filter strength should be increased. That is, if a generated code amount is over a target code amount, it is determined that the filter strength needs to be increased. If the generated code amount is not over the target code amount, it is determined that the filter strength does not need to be increased.

In Step S1601, if it is determined that the filter strength does not need to be increased, the process is ended. If it is determined that the filter strength needs to be increased, the process proceeds to Step S1602 to increase the filter strength set for the strong filter region.

Next, in Step S1603, it is determined whether the filter strength is increased enough. If it is determined that the filter strength does not need to be further increased, the process is ended. If it is determined that the filter strength needs to be further increased, the process is returned to Step S1602 and the subsequent steps are repeated. According to this embodiment, the strong filter regions correspond to frame images that have captured light from a flash and the weak filter regions correspond to any other frame image. Accordingly, the resolution of the weak filter regions is maintained at a constant value while only the resolution of the strong filter regions, i.e., the frame images that have captured light from a flash, is reduced.

Figure 29:
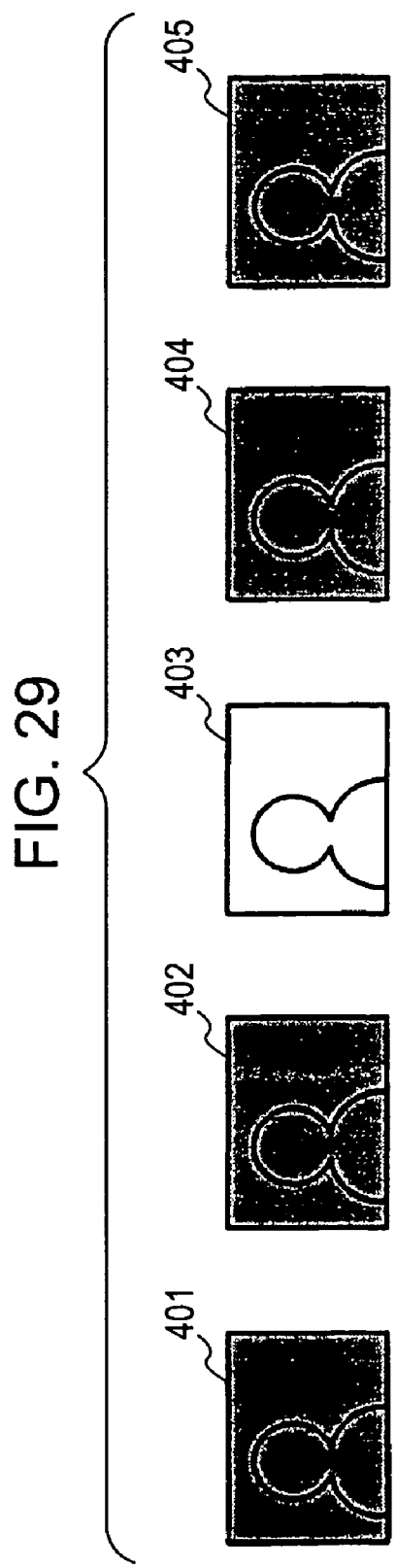
FIG. 29 illustrates a relationship between a screen image and filter strength according to the sixth embodiment.

FIG. 29 illustrates frame images. Frame images 401 to 405 are sequential images. The frame image 403 is an image that has captured light from a flash. When the above-described flash detecting unit 3118 detects the frame image that has captured light from a flash, the frame image 403 is defined as a strong filter frame and the other frame images are defined as weak filter frames.

Since the frame images previous and subsequent to the frame image 403, i.e., the frame images 402 and 404, are processed with filters having similar strengths, a significant difference is not generated in the coded data of the frame images 402 and 404. Furthermore, since a strong filter is used to process the frame image 403, the resolution of the frame image 403 can be reduced while, at the same time, the code length of the frame image 403 can be reduced. As a result, a coding system capable of producing coded images with good visibility can be realized.

According to the sixth embodiment, frame images that have captured light from a flash can be detected. By setting filter strengths based on this information, distortion due to coding can be reduced.

Seventh Embodiment

Now, an image processing apparatus according to a seventh embodiment will be described. According to the sixth embodiment, whether or not light from a flash has been captured is detected for each frame image. According to the seventh embodiment, one frame image is divided into regions that correspond to the light from a flash and regions that do not correspond to the light from a flash. Then, filter strength is set for each region.

Figure 30:
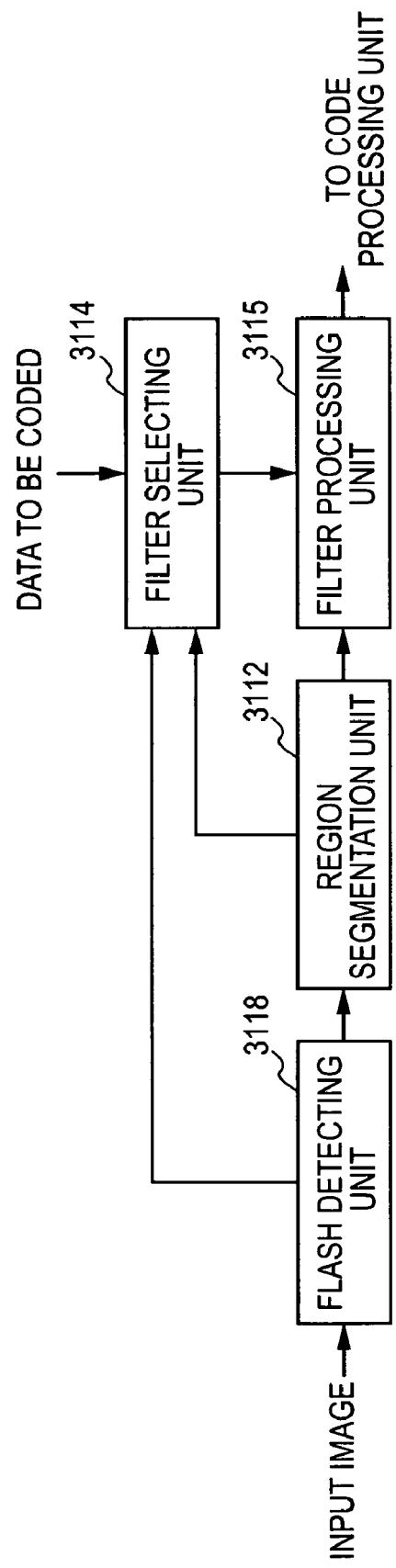
FIG. 30 is block diagram illustrating an image processing apparatus according to a seventh embodiment.

FIG. 30 is a block diagram of a pre-processing unit according to the seventh embodiment. The pre-processing unit according to the seventh embodiment differs from the pre-processing unit according to the sixth embodiment in that a region segmentation unit 3112 is interposed between a flash detecting unit 3118 and a filter processing unit 3115 and information on the region division is used for controlling a filter selecting unit 3114.

First, when the flash detecting unit 3118 detects a frame image that has captured light from a flash, the region segmentation unit 3112 divides the frame image into regions corresponding to the captured light and other regions. The information on the divided regions is sent to the filter selecting unit 3114. At the filter selecting unit 3114, filter characteristics for the regions are set in accordance with information from a rate controlling unit 3111, information on the detected flash light from the flash detecting unit 3118, and information on the region division from the region segmentation unit 3112. At the filter processing unit 3115, the filters set at the filter selecting unit 3114 are used to process the frame image so as to output a filtered image.

Figure 31:
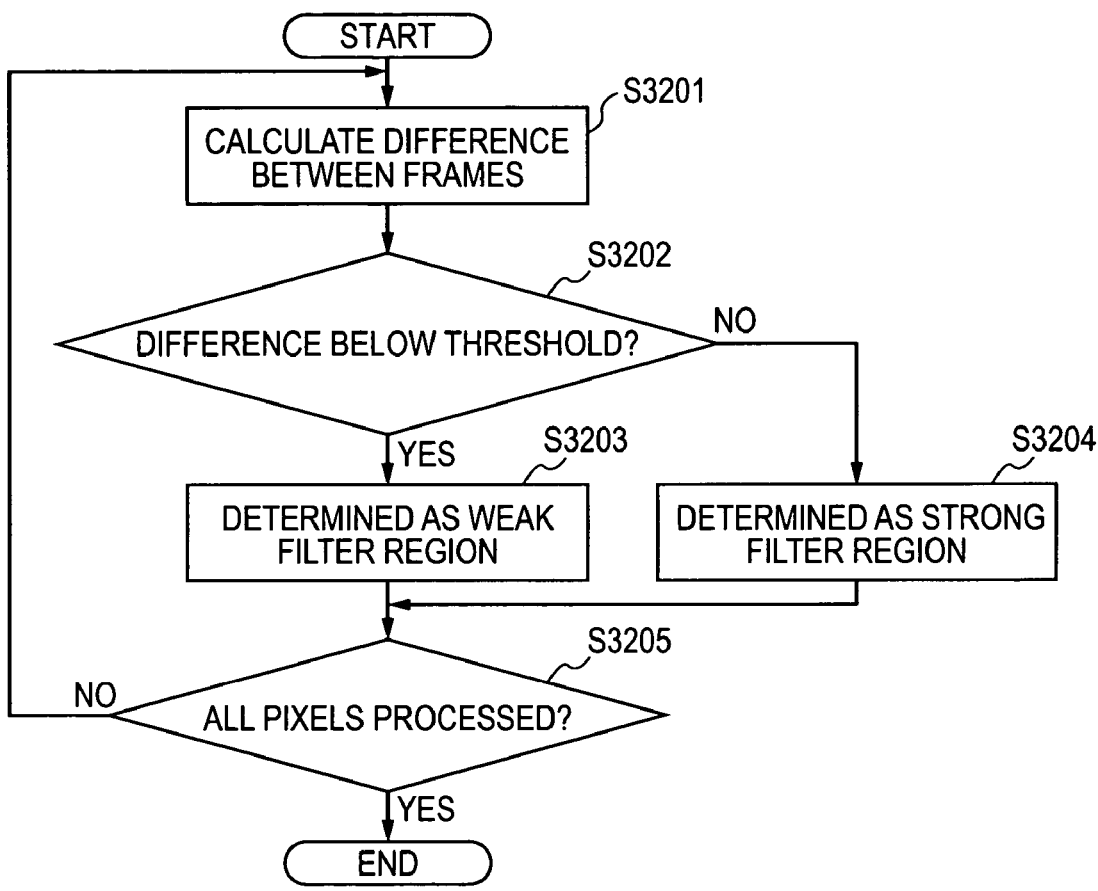
FIG. 31 is flow chart of a process according to the seventh embodiment for setting regions.

Details of the process carried out by the region segmentation unit 3112 to divide a frame image into a plurality of regions will be described below with reference to the flow chart in FIG. 31. The process is carried out on a frame image that has captured light from a flash. The process described below is carried out for each pixel.

In Step S3201, the difference between a previous frame image and a current frame image is detected. The difference between the current frame image and either the previous or subsequent frame image may be detected so long as the frame image has not captured light from a flash.

Next, in Step S3202, it is determined whether the difference detected in Step S3201 falls below a threshold value. If it is determined that the difference falls below the threshold value, it can be concluded that the pixel does not correspond to the light from a flash. Therefore, the process proceeds to Step S3203 to define the pixel as being included a weak filter region. In Step S3202, if the difference is determined to exceed the threshold value, it can be determined that the pixel is included in the region that has captured the light from a flash. Therefore, the process proceeds to Step S3204 to define the pixel as being included in a strong filter region.

After completing Step S3203 or S3204, the process proceeds to Step S3205 to determine whether all pixels have been processed. If it is determined that all pixels have not been processed, the process is returned to Step S3201 and the subsequent steps are repeated. In Step S3205, if it is determined that all pixels have been processed, the process of dividing a frame image into a plurality of regions is completed.

Figure 32:
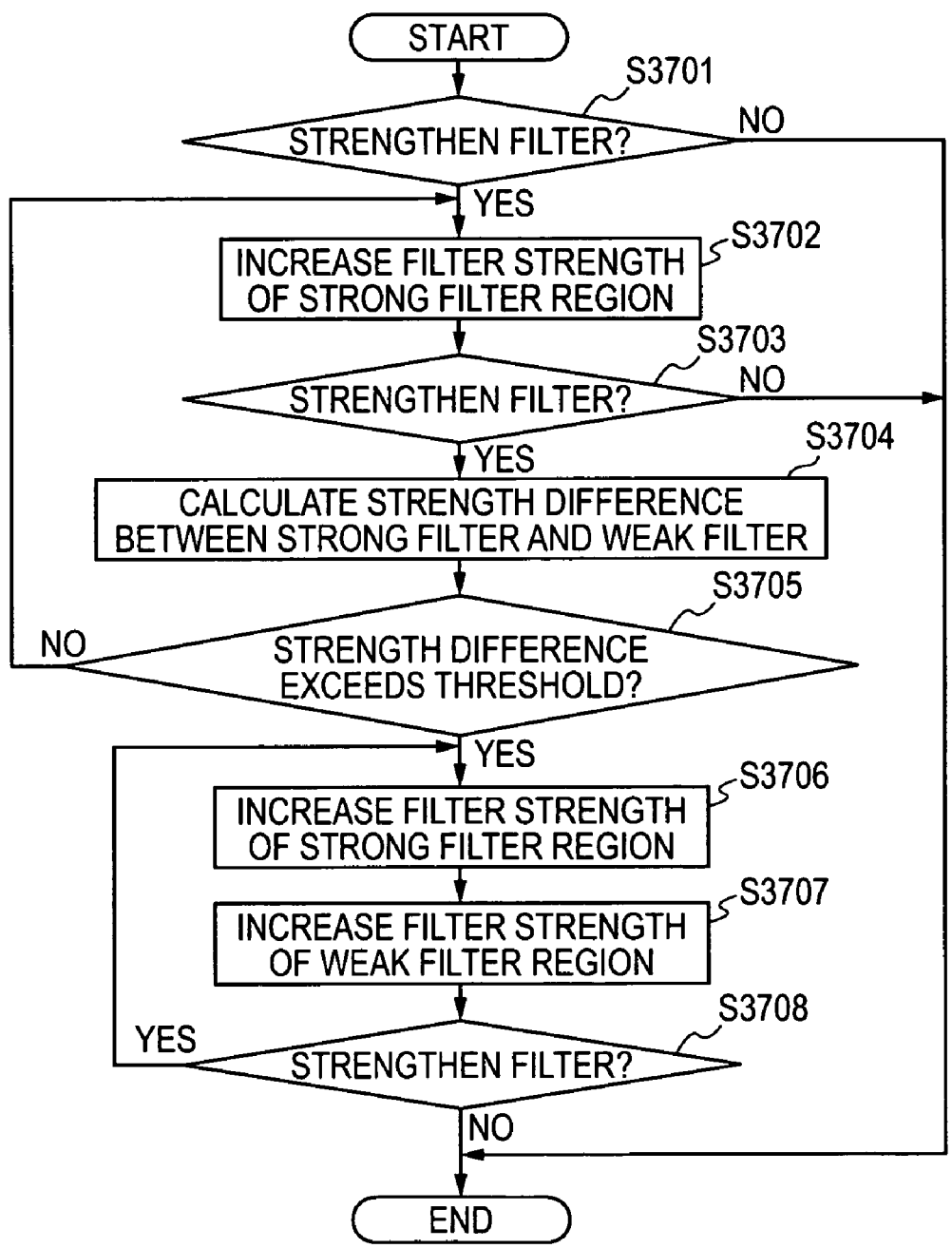
FIG. 32 is a flow chart of steps of filter selection according to the seventh embodiment.

Next, a process of setting the filter strength for a frame image that has captured light from a flash is described with reference to FIG. 32.

In Step S3701, it is determined whether the filter strength should be increased. That is, if a generated code amount is over a target code amount, it is determined that the filter strength needs to be increased. If the generated code amount is not over the target code amount, it is determined that the filter strength does not need to be increased.

In Step S3701, if it is determined that the filter strength does not need to be increased, the process is ended. If it is determined that the filter strength needs to be increased, the process proceeds to Step S3702. In Step S3702 the filter strength set for the strong filter region is increased.

Next, in Step S3703, it is determined whether the filter strength is sufficiently increased. If it is determined that the filter strength does not need to be increased, the process is ended. If it is determined that the filter strength needs to be further increased, the process proceeds to Step S3704 to calculate the difference between the filter strengths of the strong and weak filter regions.

Next, in Step S3705, it is determined whether the difference exceeds a threshold value. If it is determined that the difference does not exceed the threshold value, the process is returned to Step S3702 and the filter strength set for the strong filter region is increased.

In Step S3705, if it is determined that the difference exceeds the threshold value, the process proceeds to Step S3706 to increased the filter strength set for the strong filter region. Next, the process proceeds to Step S3707 to increase the filter strength set for the weak filter region.

The process proceeds to Step S3708, and, then, Steps S3706 to S3708 are repeated until the filter strength does not have to be further increased. According to this embodiment, filter strengths are set for each region included in the same frame image. By providing a threshold value for the difference in filter strengths, the visible degradation of the image caused by a difference in resolutions in different regions in the same frame image can be suppressed.

Figure 33A:
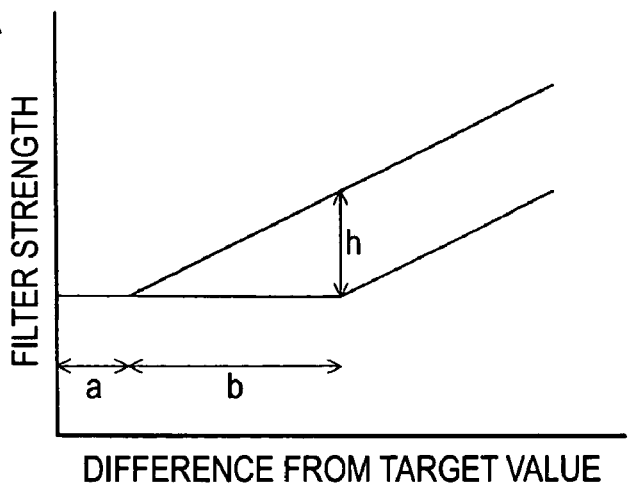
FIGS. 33A-33C are graphs used for setting the filter strength in detail according to the seventh embodiment.

FIG. 33A is a characteristics chart showing a graph illustrating a method for gradually increasing the filter strength. In this graph, the horizontal axis represents the difference between a target value of the amount of data and an actual value obtained by the filter. A stronger filter is required as the difference becomes greater toward the right. The vertical axis represents the filter strength of a filter. Filter strength is increased along the upward direction of the axis.

As shown in FIG. 33A, in a first zone a, a filter for reducing the image data is not required. If desired, a weak filter may be used for the entire image to remove noise.

In a second zone b, the filter strength set for the strong filter region is increased. In the second zone b, an intermediate filter region does not need to be generated because the difference between the filter strengths set for the strong and weak filter regions is small. When the difference between the filter strengths set for the strong and weak filter regions exceeds a predetermined threshold value, the filter strength set for the weak filter region is increased. At this time, the difference is h. In the subsequent zones, the filter strengths set for the strong and weak filter regions are increased. At this time, the difference h is maintained at a constant value.

As described above, when the difference between the filter strengths set for the strong and weak filter regions exceeds a predetermined threshold value, the difference between the filter strengths set for the filters is maintained at a constant value. However, more detailed control of the strengths set for the strong and weak filter regions is possible. Two exemplary cases are described below with reference to the flow charts shown in FIGS. 34 and 35.

Figure 33B:
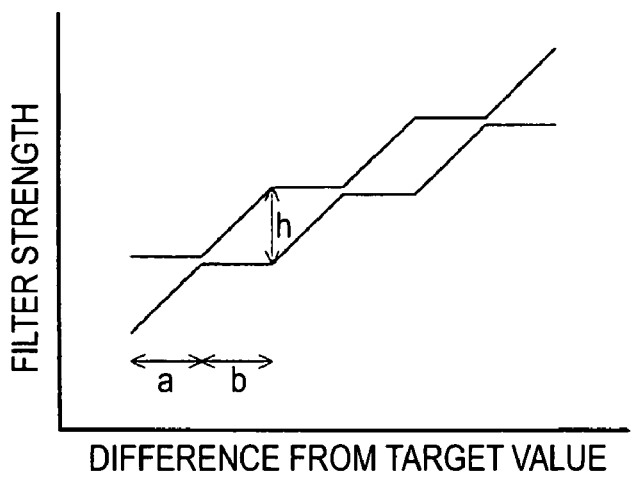
Figure 34:
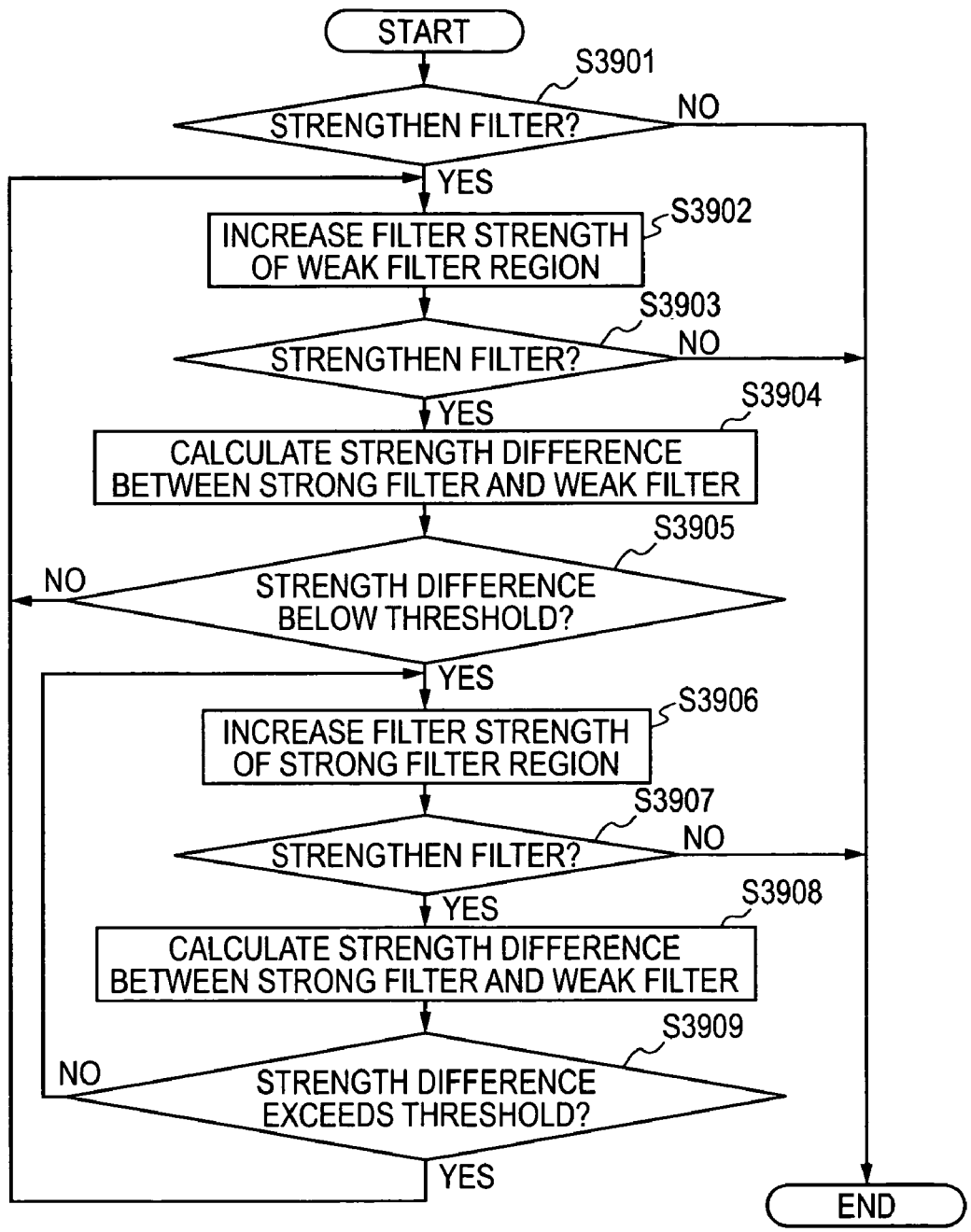
FIG. 34 is a graph used for setting the filter selection in detail according to the seventh embodiment.

FIG. 34 shows an exemplary process of first increasing the filter strength set for a weak filter region. In this case, as illustrated in FIG. 33B, the difference in filter strengths set for the weak and strong filter regions does not increase.

First, in Step S3901, it is determined whether the filter strength needs to be increased. If it is determined that the filter strength does not need to be increased, the process is ended. If it is determined that the filter strength needs to be increased, the process proceeds to Step S3902 to increase the filter strength set for the weak filter regions.

In Step S3903, it is determined whether the filter strength needs to be further increased. If it is determined that the filter strength does not need to be further increased, the process is ended. If it is determined that the filter strength needs to be increased, the process proceeds to Step S3904 to calculate the difference in the filter strengths set for the strong and weak filter regions.

Then, in Step 3905, if it is determined that the difference in filter strengths does not fall below a threshold value, the process is returned to Step S3902 to further increase the filter strength set for the weak filter region. At this time, the threshold value is determined on the basis of how much the filter strength set for the weak filters should come close to the filter strength set for the strong filters to start increasing the filter strength set for the strong filter region.

A first zone a in FIG. 33B shows the above-described process. If the difference falls below the threshold value, the process proceeds to Step S3906 to increase the filter strength set for the strong filter regions. Then, in Step S3907, it is determined whether the filter strength needs to be further increased. If it is determined that the filter strength does not need to be increased, the process is ended. If it is determined that the filter strength needs to be increased, the process proceeds to Step S3908 to calculate the difference in filter strengths set for the strong and weak filter regions.

Then, in Step S3909, it is determined whether the difference calculated in Step S3908 exceeds a threshold value. If it is determined that the difference does not exceed the threshold value, the process is returned to Step S3906 to further increase the filter strength set for the strong filter regions. At this time, the threshold value is determined on the basis of how much the filter strength set for the strong filters should move apart from the filter strength set for the weak filters to start increasing the filter strength set for the weak filter region. A second zone b in FIG. 33B shows the above-described process, and the difference is represented by h.

In Step S3909, if it is determined that the difference exceeds the threshold value, the process is returned to Step S3902, and Steps S3902 to S3909 are repeated until the filter strength does not have to be increased.

Next, another exemplary case is described in detail with reference to FIGS. 33C and 35.

Figure 35:
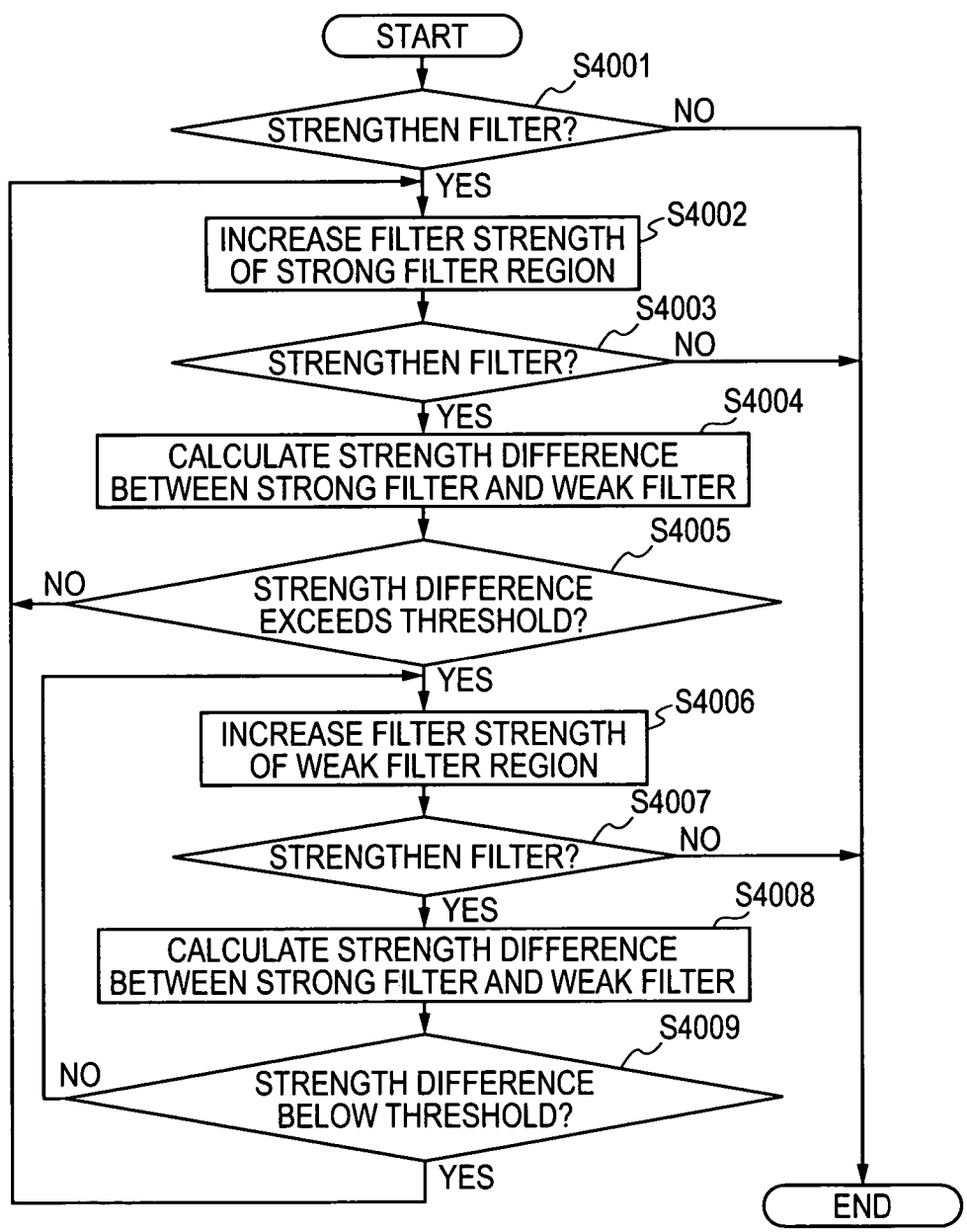
FIG. 35 is a graph used for setting the filter selection in detail according to the seventh embodiment.

FIG. 35 shows an exemplary process of first increasing the filter strength set for a strong filter region. In this case, as illustrated in FIG. 33C, the difference in filter strengths set for the weak and strong filter regions does not increase.

First, in Step S4001, it is determined whether the filter strength needs to be increased. If it is determined that the filter strength does not need to be increased, the process is ended. In Step S4001, if it is determined that the filter strength needs to be increased, the process proceeds to Step S4002 to increase the filter strength set for the strong filter regions.

In Step S4003, it is determined whether the filter strength needs to be further increased. If it is determined that the filter strength does not need to be further increased, the process is ended. If it is determined that the filter strength needs to be increased, the process proceeds to Step S4004 to calculate the difference in the filter strengths set for the strong and weak filter regions.

Then, in Step 4005, it is determined whether the difference exceeds a threshold value. If the difference does not exceed the threshold value, the process is returned to Step S4002 to further increase the filter strength set for the strong filter region. At this time, the threshold value is determined on the basis of how much the filter strength set for the strong filters should move apart from the filter strength set for the weak filters to start increasing the filter strength set for the weak filter region.

Figure 33C:
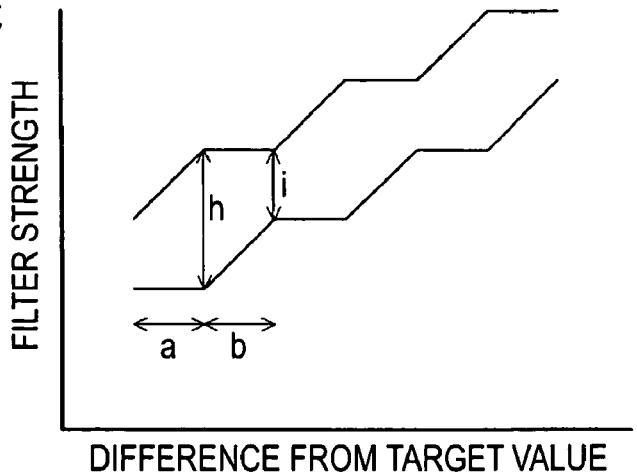

A first zone a in FIG. 33C shows the above-described process, and the difference in filter strengths is h. If the difference exceeds the threshold value, the process proceeds to Step S4006 to increase the filter strength set for the weak filter regions.

Then, in Step S4007, it is determined whether the filter strength should be further increased. If it is determined that the filter strength does not need to be increased, the process is ended. If it is determined that the filter strength needs to be further increased, the process proceeds to Step S4008 to calculate the difference in filter strengths set for the weak and strong filter regions.

Then, in Step S4009, it is determined whether the difference falls below a threshold value. If the difference does not fall below the threshold value, the process is returned to Step 4006 to further increase the filter strength set for the weak filter regions. At this time, the threshold value is determined on the basis of how much the filter strength set for the weak filter region should come close to the filter strength set for the weak filter region to start increasing the filter strength of the strong filter region.

A second zone b in FIG. 33C shows the above-described process, and the difference is i. If it is determined that the difference is below the threshold value, the process is returned to Step S4002, and Steps S4002 to S4009 are repeated until the filter strength does not have to be further increased.

Figure 36:
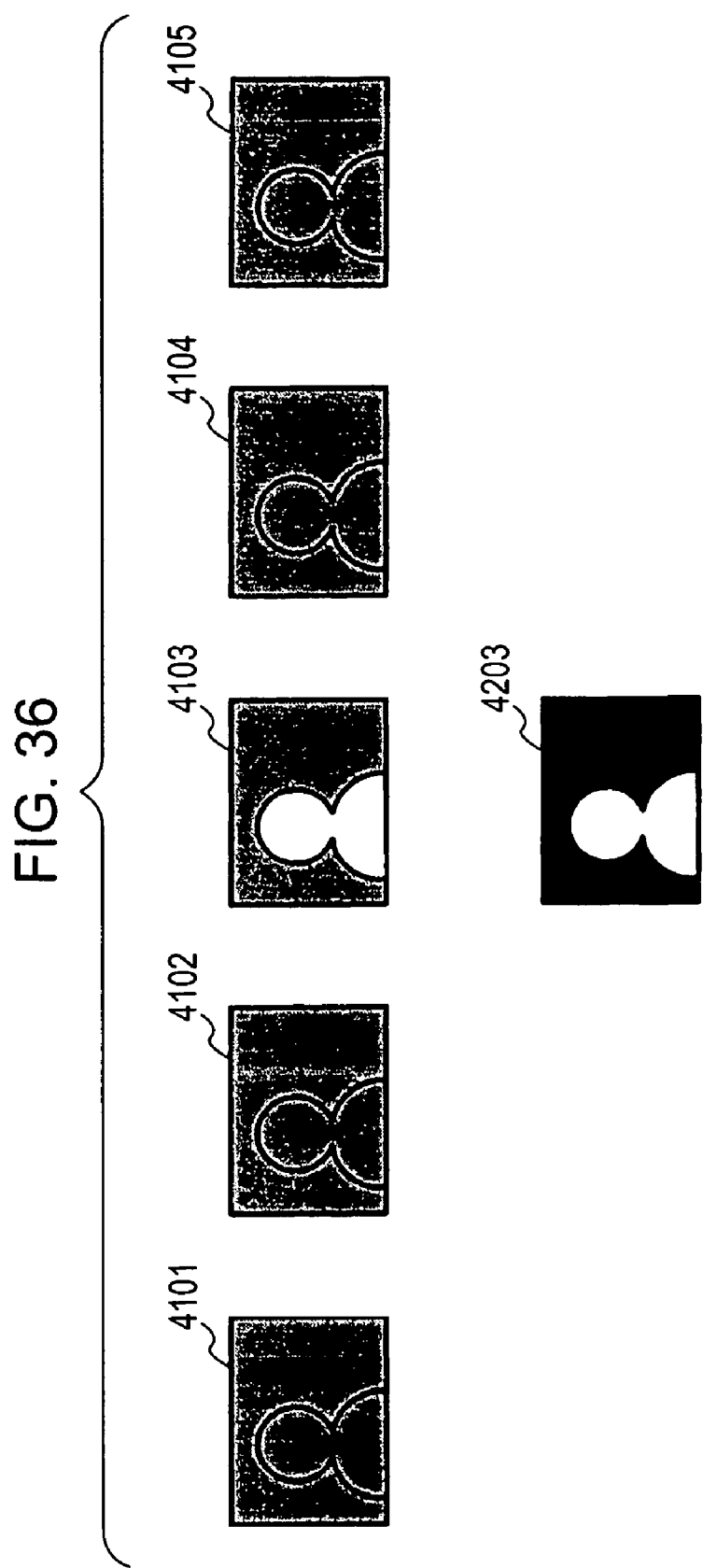
FIG. 36 illustrates a relationship between a screen image and filter strength according to the seventh embodiment.

FIG. 36 illustrates frame images. In FIG. 36, frame images 4101 to 4105 are sequential images. The frame image 4103 is an image that has captured light from a flash.

A frame image 4203 is obtained when the frame image 4103 is divided into regions. In FIG. 36, the regions in white are regions corresponding to the light from a flash and the regions in black are regions not corresponding to the light from a flash. Since the regions not corresponding to the light from a flash in each frame are processed with filters having the same filter strength, a significant difference is not generated in the coded data of the regions.

Since a strong filter is used to process the frame image 4103, the resolution of the frame image 4103 can be reduced while, at the same time, the code length of the frame image 4103 can be reduced. As a result, a coding system capable of producing coded images with good visibility can be realized.

According to the seventh embodiment, the frame image 4103 including regions corresponding to the light from a flash is detected and is divided into regions corresponding to the light from a flash and regions not corresponding to the light from a flash. Then, based on this information, the filter strengths used to process the regions are set. In this way, an image can be coded in a highly efficient manner while reducing visible distortion.

Eighth Embodiment

Next, an image processing apparatus according to an eighth embodiment will be described.

Figure 37:
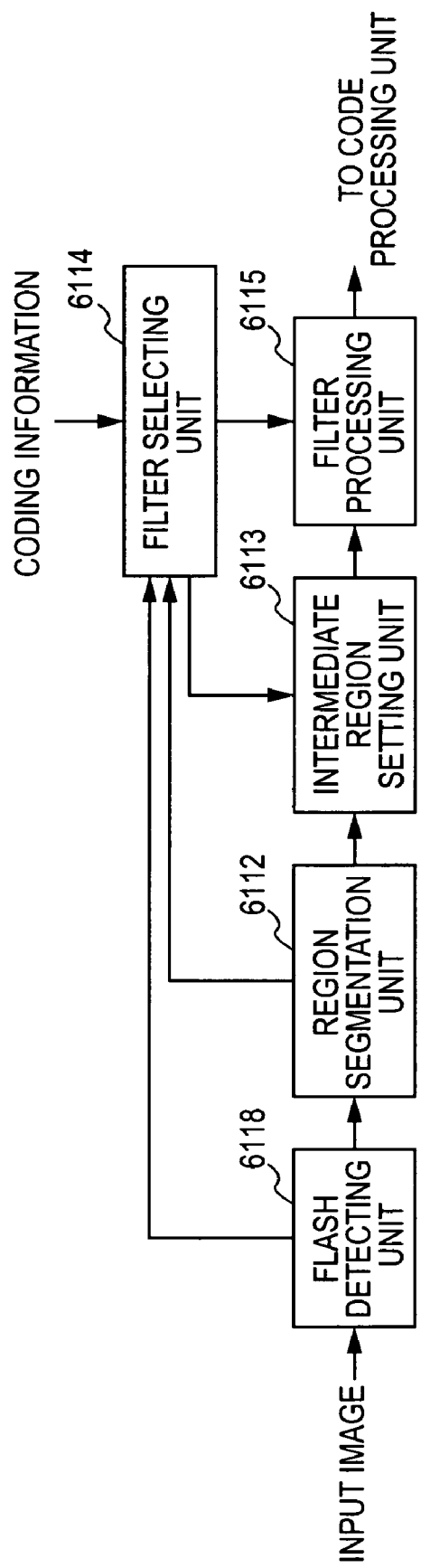
FIG. 37 is block diagram illustrating an image processing apparatus according to an eighth embodiment.

FIG. 37 is a block diagram of the structure of a pre-processing unit according to the eighth embodiment.

The eighth embodiment differs from the sixth and seventh embodiments in that, after an image is divided into regions on the basis of the results of detecting light from a flash, generation of intermediate filter regions and filter strengths are controlled in accordance with the divided regions.

First, a flash detecting unit 6118 detects a frame image that has captured light from a flash. Then, a region segmentation unit 6112 divides the image into regions corresponding to the light from the flash and other regions. The information concerning the divided region is sent to a filter selecting unit 6114. The filter selecting unit 6114 sets the filter strengths of filters to be used to process the regions on the basis of information from a rate controlling unit 6111, information on the regions corresponding to the light from the flash from the flash detecting unit 6118, and information on the region division from the region segmentation unit 6112. If it is determined that an intermediate region needs to be generated on the basis of the filter strengths set for the regions, a filter strength for an intermediate region is set and a new intermediate region is generated at an intermediate region setting unit 6113. At a filter processing unit 6115, filters corresponding to the regions are used to process the image and a filtered image is output.

An image 6201 in FIG. 38 is a digitalized image of a frame image of a moving image including regions corresponding to light from a flash. The regions in white are regions corresponding to the light from a flash and are defined as strong filter regions. The regions in black are defined as weak filter regions. Intermediate filter regions are generated in the strong filter regions adjacent to the weak filter regions. The hatched regions in an image 6202 corresponds the intermediate filter regions.

According to the eighth embodiment, the difference between regions corresponding to light from a flash and the other regions is moderated. In this way, the image will visually appear more natural.

Other Embodiments

The various processing units according to above-described embodiments can actually be realized by software although they include hardware for configuring a network. In other words, according to another embodiment, a storage medium (or recording medium) that stores program code (software) capable of realizing the functions according to the above-described embodiments is supplied to a system or an apparatus. A computer (central processing unit (CPU) or microprocessing unit (MPU)) included in the system or the apparatus reads out the program code stored on the storage medium and executes the program code. In such a case, the program code read out from the storage medium realizes the functions according to the above-described embodiments.

An aspect of the present invention is not limited to executing the program code read out by a computer. Another aspect of the present invention may be also realized by entirely or partially carrying out the actual processing by an operation system (OS) operating on the computer in accordance with the program code to perform the functions of the above-described embodiments.

Another aspect of the present invention includes the steps of realizing the functions according to the above-described embodiments by executing the program code read out from the storage medium and written in a function expansion board mounted in the computer or a function expansion unit connected to the computer. More specifically, an aspect of the present invention may be realized by entirely or partially carrying out the actual processing by a CPU included in the function expansion board or the function expansion unit in accordance with the program code.

In other words, the foregoing description of embodiments has been given for illustrative purposes only and is not to be construed as imposing any limitation in any respect.

The scope of the invention is, therefore, to be determined solely by the following claims and not limited by the text of the specifications and alterations made within a scope equivalent to the scope of the claims fall within the true spirit and scope of the invention.

This application claims the benefit of Japanese Application No. 2004-342105 filed Nov. 26, 2004 and No. 2004-342104 filed Nov. 26, 2004 and No. 2005-330765 filed Nov. 15, 2005, which are hereby incorporated by reference herein in their entirety.

What is claimed is:

1. An image processing apparatus comprising:
   a pre-processing unit configured to output an image after reducing the amount of data of the image; and
   a coded data generating unit configured to generate coded data from the image whose amount of data has been reduced by the pre-processing unit,
   wherein the pre-processing unit comprises,
     a region segmentation unit configured to divide an image into a plurality of regions,
     a filter setting unit configured to set a filter strength for each region of an image divided by the region segmentation unit,
     an intermediate region setting unit configured to generate an intermediate region according to the filter strength set by the filter setting unit, and
     a filter processing unit configured to carry out filter processing according to the filter strength set by the filter setting unit.

2. The image processing apparatus according to claim 1, wherein,
   the region segmentation unit comprises a color detecting unit configured to detect a predetermined color, and to assign a region in which the predetermined color is detected as a weak filter region and a region in which the predetermined color is not detected as a strong filter region.

3. The image processing apparatus according to claim 2, wherein,
the filter setting unit is configured to set a filter strength for an intermediate filter region when the difference between the filter strength of a strong filter region and the filter strength of a weak filter region exceeds a predetermined threshold value, and to promote the generation of the intermediate region by the intermediate region setting unit.

4. The image processing apparatus according to claim 1, wherein the region segmentation unit comprises,
a region integrating unit configured to integrate regions of similar colors, and
an object region determining unit configured to define an object based on the integrated regions integrated by the region integrating unit, and
wherein a region defined as an object by the object region determining unit is assigned as a weak filter region and a region not defined as an object by the region integrating unit is assigned as a strong filter region.

5. The image processing apparatus according to claim 4, wherein,
the filter setting unit is configured to set a filter strength for an additional intermediate filter region when the difference between the filter strength of an existing intermediate filter region and the filter strength of a weak filter region exceeds a predetermined threshold value, and to promote the generation of the additional intermediate region by the intermediate region setting unit.

6. The image processing apparatus according to claim 1, wherein,
the region segmentation unit comprises an image comparing unit configured to compare an input image and a background image, and
a region in which the difference between the input image and the background image is small is assigned as a strong filter region and a region in which the difference between the input image and the background image is great is assigned as a weak filter region.

7. The image processing apparatus according to claim 1, wherein the filter setting unit is configured to set the filter strength of each region in accordance with coding information from the coded data generating unit, region division information from the region segmentation unit, and intermediate region generation information from the intermediate region setting unit.

8. The image processing apparatus according to claim 1, wherein the intermediate region setting unit is configured to generate an additional intermediate region at a border region where the filter strengths of two adjacent regions have a predetermined difference, the additional intermediate region being generated in accordance with filter strength set by the filter setting unit.

9. The image processing apparatus according to claim 1, wherein the pre-processing unit comprises,
a motion detecting unit configured to detect motion in adjacent image frames, and
a corresponding-regions determining unit configured to determine corresponding-regions in each frame image based on a detection result provided by the motion detection unit and regions divided by the region segmentation unit.

10. A method of processing an image by an image processing apparatus, the method comprising:

a reducing step, performed by a pre-processing unit of the image processing apparatus, of reducing the amount of data of an image and outputting the image whose amount of data has been reduced; and
a producing step, performed by a coded data generating unit of the image processing apparatus, of producing coded data from the image whose amount of data has been reduced in the reducing step,
wherein the reducing step, performed by the pre-processing unit, comprises,
a dividing step, performed by a region segmentation unit of the pre-processing unit, of dividing a frame image into a plurality of regions,
a setting step, performed by a filter setting unit of the pre-processing unit of setting a filter strength for each region of the frame image divided in the dividing step,
a generating step, performed by an intermediate region setting unit of the pre-processing unit of generating an intermediate region according to the filter strength set in the setting step, and
a performing step, performed by a filter processing unit of the pre-processing unit of performing filter processing according to the filter strength in the setting step.

11. A recording medium readable by a computer storing a computer program according to claim 10.

12. An image processing apparatus comprising:
a pre-processing unit configured to output a moving image including a plurality of frames after reducing the amount of data of the image; and
a coded data generating unit configured to generate coded data from the moving image whose amount of data has been reduced by the pre-processing unit,
wherein the pre-processing unit comprises,
a flash detecting unit configured to detect a frame in which light from a flash has been captured among a series of frames,
a filter setting unit configured to set a filter strength in accordance with a detection result of the flash detecting unit, and
a filter processing unit configured to carry out filter processing according to the filter strength set by the filter setting unit.

13. The image processing apparatus according to claim 12, further comprising:
an intermediate region setting unit configured to generate an intermediate region according to the filter strength set by the filter setting unit.

14. The image processing apparatus according to claim 12, wherein the filter setting unit is configured to set the filter strength in accordance with coding information from the coded data generating unit and flash detection information from the flash detecting unit.

15. The image processing apparatus according to claim 14, wherein the filter setting unit is configured to set a strong filter for a frame in which a flash was detected by the flash detecting unit and to set a weak filter for a frame in which a flash was not detected by the flash detecting unit.

16. The image processing apparatus according to claim 12, wherein,
the flash detecting unit comprises a frame correlation detecting unit configured to determine correlations between previous, current, and subsequent frames, and
the flash detecting unit is configured to determine that light from a flash has been captured when the frame correlation detecting unit determines that the previous frame and the current frame have a low correlation, the subsequent frame and the current frame have a low correlation, and the previous frame and the subsequent frame have a high correlation.

17. The image processing apparatus according to claim 12, wherein, the pre-processing unit further comprises a region segmentation unit configured to divide an image corresponding to a frame into a region in which light from a flash is captured and a region in which a flash is not captured, and the region segmentation unit assigns the region in which light from a flash is captured as a strong filter region and assigns a region in which a flash was not captured as a weak filter region.

18. A method of processing an image by an image processing apparatus, the method comprising:

a reducing step, performed by a pre-processing unit of the image processing apparatus, of reducing the amount of data of a moving image including a plurality of frames and outputting the image whose amount of data has been reduced; and a generating step, performed by a coded data generating unit of the image processing apparatus, of generating coded data from a moving image whose amount of data has reduced in the reducing step, wherein the reducing step, performed by the pre-processing unit, comprises, a detecting step, performed by a flash detecting unit of the pre-processing unit, of detecting a frame in which light from a flash has been captured among a series of frames, a setting step, performed by a filter setting unit of the pre-processing unit, of setting a filter strength in accordance with the detection result from the detecting step, and a performing step, performed by a filter processing unit of the pre-processing unit, of performing filter processing according to the filter strength set in the setting step.

19. A recording medium readable by a computer storing a computer program according to claim 18.

* * * * *